US010761718B2

(12) United States Patent
Nakamura et al.

(10) Patent No.: US 10,761,718 B2
(45) Date of Patent: Sep. 1, 2020

(54) ELECTRONIC WHITEBOARD, METHOD FOR IMAGE PROCESSING IN ELECTRONIC WHITEBOARD, AND RECORDING MEDIUM CONTAINING COMPUTER PROGRAM OF ELECTRONIC WHITEBOARD

(71) Applicant: RICOH COMPANY, Ltd., Ohta-Ku (JP)

(72) Inventors: Shigeru Nakamura, Kanagawa (JP); Yuichi Kawasaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 97 days.

(21) Appl. No.: 15/761,615

(22) PCT Filed: Sep. 2, 2016

(86) PCT No.: PCT/JP2016/075903
§ 371 (c)(1),
(2) Date: Mar. 20, 2018

(87) PCT Pub. No.: WO2017/051687
PCT Pub. Date: Mar. 30, 2017

(65) Prior Publication Data
US 2019/0065041 A1  Feb. 28, 2019

(30) Foreign Application Priority Data
Sep. 25, 2015 (JP) ................ 2015-187576

(51) Int. Cl.
*G06F 3/0488* (2013.01)
*G06F 3/041* (2006.01)
(Continued)

(52) U.S. Cl.
CPC ...... *G06F 3/04883* (2013.01); *G06F 3/03545* (2013.01); *G06F 3/041* (2013.01);
(Continued)

(58) Field of Classification Search
None
See application file for complete search history.

(56) References Cited

U.S. PATENT DOCUMENTS

2011/0093822 A1* 4/2011 Sherwani ............... H04L 67/38
715/863
2012/0235934 A1* 9/2012 Kawasaki .......... G06F 3/03545
345/173

(Continued)

FOREIGN PATENT DOCUMENTS

CN  105573536  * 10/2014
JP  07-288878  10/1995

(Continued)

OTHER PUBLICATIONS

International Search Report dated Dec. 6, 2016 in PCT/JP2016/075903 filed Sep. 2, 2016.

(Continued)

*Primary Examiner* — Ifedayo B Iluyomade
(74) *Attorney, Agent, or Firm* — Xsensus LLP

(57) ABSTRACT

For the purpose of improving the usability of an electronic whiteboard in, for example, setting work by a user, an electronic whiteboard (2) of the present invention includes: an event acquisition unit (22, 24) configured to acquire information indicating an object coming into contact with a display (3, 115) and event information such as the coordinates of a contact location; an identifying unit (25, 38) configured to identify whether the contact object is an electronic pen (4) or a user's hand, and identify the event type, such as stroke drawing, UI operation, or gesture operation, from the coordinates of a contact location and the model name of an electronic whiteboard; and a processing unit (26, 27, 32) configured to perform processing on the event the type of which has been identified.

9 Claims, 22 Drawing Sheets

(51) Int. Cl.
    *G06F 3/0354* (2013.01)
    *G06F 3/14* (2006.01)

(52) U.S. Cl.
    CPC .......... *G06F 3/0416* (2013.01); *G06F 3/0488* (2013.01); *G06F 3/1454* (2013.01); *G06F 2203/04104* (2013.01); *G06F 2203/04808* (2013.01)

(56) References Cited

U.S. PATENT DOCUMENTS

| | | | |
|---|---|---|---|
| 2013/0009887 A1 | 1/2013 | Huang et al. | |
| 2013/0050145 A1* | 2/2013 | Robinson | G06F 3/0425 345/174 |
| 2015/0077369 A1 | 3/2015 | Nagahara et al. | |
| 2015/0091859 A1 | 4/2015 | Rosenberg et al. | |
| 2015/0355750 A1 | 12/2015 | Han et al. | |
| 2017/0075496 A1 | 3/2017 | Rosenberg et al. | |
| 2017/0220245 A1* | 8/2017 | Ding | G06F 3/041 |
| 2017/0322674 A1 | 11/2017 | Rosenberg et al. | |

FOREIGN PATENT DOCUMENTS

| | | |
|---|---|---|
| JP | 2008-102339 | 5/2008 |
| JP | 2015-084211 | 4/2015 |
| WO | WO 2012/100204 A1 | 7/2012 |
| WO | WO 2015/053563 A1 | 4/2015 |

OTHER PUBLICATIONS

Extended European Search Report dated Aug. 2, 2018 in European Patent Application No. 16848475.6, 8 pages.

* cited by examiner

| MODEL NUMBER OF DISPLAY | MODEL NAME OF ELECTRONIC WHITEBOARD |
|---|---|
| A0001 | EA800 |
| B0001 | EB700 |
| ⋮ | ⋮ |

FIG.10

| PAGE DATA ID | START TIME | FINISH TIME | STROKE ARRAY DATA ID | MEDIA DATA ID |
|---|---|---|---|---|
| p001 | 20130610102423 | 20130610102802 | st001 | m001 |
| p002 | 20130610102815 | 20130610103225 | st002 | m002 |
| p003 | 20130610103545 | 20130610104233 | st003 | m003 |
| ⋮ | ⋮ | ⋮ | ⋮ | ⋮ |

FIG.14

| MEDIA DATA ID | DATA TYPE | RECORDING TIME | X COORDINATE VALUE | Y COORDINATE VALUE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ... | ... | ... | ... | ... | ... | ... | ... |

FIG.15

| PRODUCT ID | LICENSE ID | EXPIRATION DATE |
|---|---|---|
| 1001 | 12345678abcdefgh | 2015/12/31 |
| 1002 | 4321dcba8765hgfe | 2015/12/31 |
| ⋮ | ⋮ | ⋮ |

FIG.17

| NAME | MAIL ADDRESS |
|---|---|
| TARO | taro@alpha.co.jp |
| HANAKO | hanako@bete.co.jp |
| JIRO | jiro@gamma.co.jp |
| ⋮ | ⋮ |

FIG.18

| |
|---|
| lwb-20130610104423.pdf |
| lwb-20130625152245.pdf |
| lwb-20130628113418.pdf |
| ⋮ |

FIG.19

| NAME | IP ADDRESS |
|---|---|
| CONFERENCE ROOM 1 | 192.0.0.1 |
| CONFERENCE ROOM 2 | 192.0.0.2 |
| CONFERENCE ROOM 3 | 192.0.0.3 |
| ⋮ | ⋮ |

FIG.21

| NAME | IP ADDRESS |
|---|---|
| CONFERENCE ROOM 1 | 192.0.0.1 |
| CONFERENCE ROOM 2 | 192.0.0.2 |
| CONFERENCE ROOM 8 | 192.0.0.8 |
| ⋮ | ⋮ |

FIG.22

| SEQ | OPERATION NAME | TRANSMISSION SOURCE | | TRANSMISSION DESTINATION | | OPERATION TYPE | OPERATION TARGET | DATA |
|---|---|---|---|---|---|---|---|---|
| | | IP ADDRESS | PORT NUMBER | IP ADDRESS | PORT NUMBER | | | |
| 1 | ADD | 192.0.0.1 | 50001 | 192.0.0.1 | 50000 | STROKE | p005 | ···(STROKE DATA) |
| 2 | ADD | 192.0.0.1 | 50000 | 192.0.0.1 | 50001 | STROKE | p005 | ···(STROKE DATA) |
| 3 | UPDATE | 192.0.0.2 | 50001 | 192.0.0.1 | 50000 | STROKE | p006 | (50,40) |
| 4 | UPDATE | 192.0.0.1 | 50000 | 192.0.0.1 | 50001 | STROKE | p006 | (50,40) |
| 5 | DELETE | 192.0.0.2 | 50001 | 192.0.0.1 | 50000 | STROKE | p007 | - |
| 6 | DELETE | 192.0.0.1 | 50000 | 192.0.0.1 | 50001 | STROKE | p007 | - |
| 7 | ADD | 192.0.0.1 | 50001 | 192.0.0.1 | 50000 | PAGE | - | - |
| 8 | ADD | 192.0.0.1 | 50000 | 192.0.0.2 | 50001 | PAGE | - | - |
| 9 | ADD | 192.0.0.2 | 50001 | 192.0.0.1 | 50000 | IMAGE | p006 | rico.jpg |
| 10 | ADD | 192.0.0.1 | 50000 | 192.0.0.1 | 50001 | IMAGE | p006 | rico.jpg |
| ... | ... | ... | | ... | | ... | ... | ... |

FIG.25

| MODEL NUMBER OF DISPLAY | DEVICE CONFIGURATION OF ELECTRONIC WHITEBOARD | |
| --- | --- | --- |
| | PRESENCE OR ABSENCE OF ELECTRONIC PEN CONTROLLER | ... |
| A0001 | PRESENT | ... |
| B0001 | ABSENT | ... |
| ⋮ | ⋮ | ⋮ |

ELECTRONIC WHITEBOARD, METHOD FOR IMAGE PROCESSING IN ELECTRONIC WHITEBOARD, AND RECORDING MEDIUM CONTAINING COMPUTER PROGRAM OF ELECTRONIC WHITEBOARD

FIELD

The present invention generally relates to an electronic whiteboard, a method for image processing in the electronic whiteboard, and a recording medium containing a computer program of the electronic whiteboard.

BACKGROUND

In recent years, an electronic whiteboard apparatus called an electronic information board in which a touch panel is mounted in a flat panel display such as a liquid crystal display or a projection screen of a projector has been utilized in ordinary meetings and teleconferences.

For example, Patent Literature 1 discloses an image processing system in which a plurality of information processing apparatuses sharing an image displayed on their own display units is connected to each other via a network.

SUMMARY

Technical Problem

However, for the information processing apparatuses of the image processing system disclosed in Patent Literature 1, a user needs to make various settings, and hence, there is room for improvement in usability for users.

Solution to Problem

The present invention provides an electronic whiteboard that includes: a display unit configured to display an image; an event acquisition unit configured to acquire an event occurred on the display unit; an identifying unit configured to identify a type of the event with reference to device information; and a processing unit configured to perform processing on the event according to a result of identification by the identifying unit.

Advantageous Effects of Invention

The electronic whiteboard according to the present invention enables a reduction in user's setting work and improvement in usability for users.

BRIEF DESCRIPTION OF DRAWINGS

FIG. 10 is a diagram for describing page data.

FIG. 14 is a diagram for describing media data.

FIG. 15 is a diagram for describing a remote license management table.

FIG. 17 is a diagram for describing an address book management table.

FIG. 18 is a diagram for describing backup data.

FIG. 19 is a diagram for describing a connection destination management table.

FIG. 21 is a diagram for describing a participating site management table.

FIG. 22 is a diagram for describing operation data.

FIG. 25 is a diagram illustrating an example of device configuration information.

DESCRIPTION OF EMBODIMENTS

Figure 1:
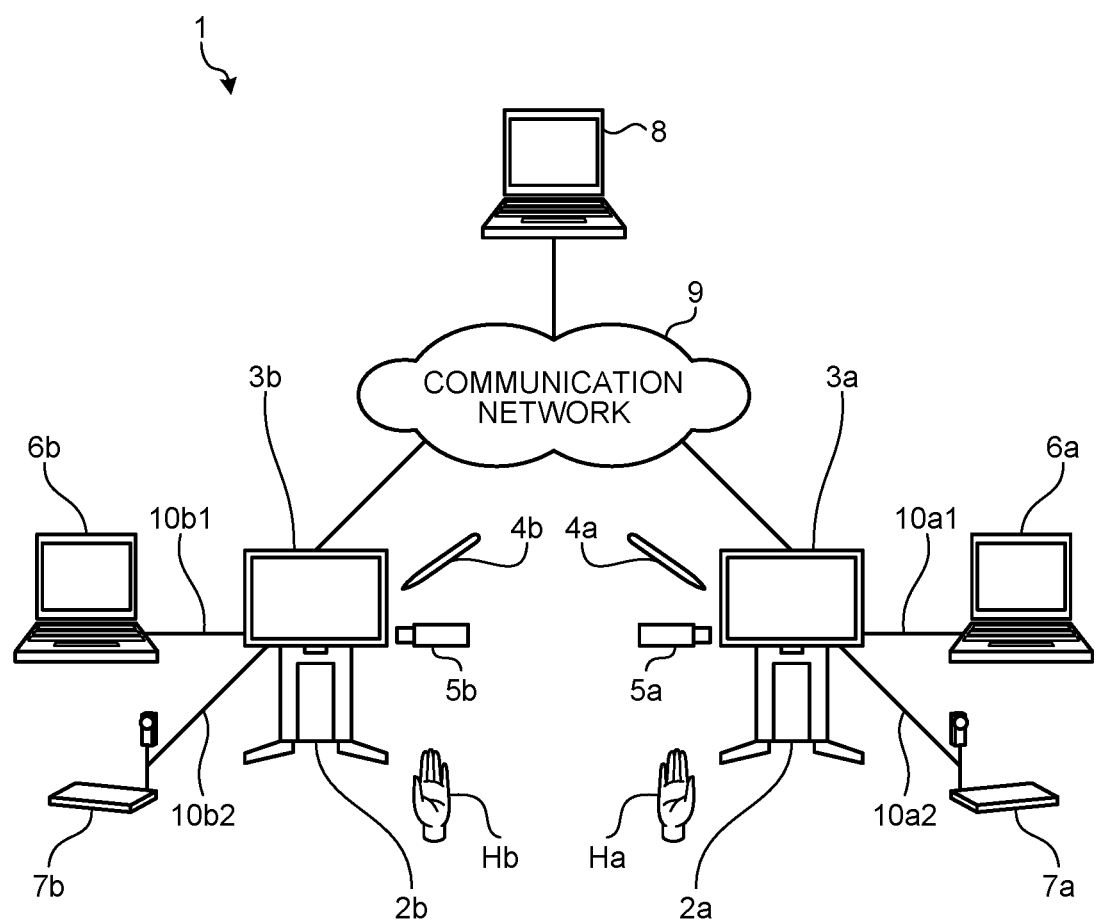
FIG. 1 is a schematic configuration diagram of an image processing system according to one embodiment.

Hereinafter, one embodiment of the present invention will be described with reference to FIG. 1 to FIG. 26. FIG. 1 illustrates a schematic configuration of an image processing system 1 according to the embodiment.

This image processing system 1 includes a plurality of electronic whiteboards and a personal computer (PC) 8 which are connected to each other via a communication network (network line) 9 so as to enable mutual communication therebetween. Here, a case where the electronic whiteboards are two electronic whiteboards (2a, 2b) is described for convenience, but, the present invention is not limited to this. The electronic whiteboards may be three or more electronic whiteboards. Note that the electronic whiteboards are separately provided in different sites. The PC 8 is a PC for viewing a shared image.

The electronic whiteboard 2a is connected to a notebook PC 6a via a cable 10a1, and connected to a videoconference terminal 7a via a cable 10a2. Likewise, the electronic whiteboard 2b is connected to a notebook PC 6b via a cable 10b1, and connected to a videoconference terminal 7b via a cable 10b2.

Each of the cables is a cable that enables communication according to standards, such as DisplayPort, Digital Visual Interface (DVI), High-Definition Multimedia Interface (HDMI) (registered trademark), and Video Graphics Array (VGA).

Note that each of the notebook PCs and each of the videoconference terminals may be connected to a corresponding one of the electronic whiteboards by wireless communication in accordance with a wireless communication standard, such as Bluetooth (registered trademark).

The electronic whiteboard 2a includes a display 3a. Likewise, the electronic whiteboard 2b includes a display 3b. The display 3a and the display 3b have different model numbers. Here, the model number of the display 3a is exemplarily defined as "A0001", and the model number of the display 3b is exemplarily defined as "B0001."

The image processing system 1 further includes an electronic pen 4a and a USB memory 5a that correspond to the electronic whiteboard 2a, and includes an electronic pen 4b and a USB memory 5b that correspond to the electronic whiteboard 2b.

The pen point of each of the electronic pens is, when pressed against a corresponding one of the displays, pushed into a corresponding one of the electronic pens by the repulsive force from the display. When the pen point is pushed into the electronic pen, a corresponding one of the electronic whiteboards is notified of this. Here, communications between the electronic pens and the respective electronic whiteboards are performed using infrared rays. Note that, in FIG. 1, a symbol Ha denotes a hand of a user of the electronic whiteboard 2a, and a symbol Hb denotes a hand of a user of the electronic whiteboard 2b.

In the electronic whiteboard 2a, a drawing is allowed to be made on the display 3a with the electronic pen 4a or the hand Ha. In contrast, in the electronic whiteboard 2b, a drawing is not allowed to be made on the display 3b by using the hand Hb, but allowed to be made thereon by using only the electronic pen 4b. That is, the model of the electronic whiteboard 2a and the model of the electronic whiteboard 2b are different from each other. Here, the model name of the electronic whiteboard 2a is defined as "EA800", and the model name of the electronic whiteboard 2b is defined as "EB700".

An image drawn on the display 3a of the electronic whiteboard 2a at one site is also displayed on the display 3b of the electronic whiteboard 2b at another site. On the contrary, an image drawn on the display 3b of the electronic whiteboard 2b at the other site is displayed on the display 3a of the electronic whiteboard 2a at the one site. As described above, the image processing system 1 enables remote sharing processing for sharing the same image among remote sites, and is therefore very useful for teleconferencing, for example. Note that a shared image is displayed also on the display of the PC 8.

Furthermore, in each of the electronic whiteboards, an image displayed on a corresponding one of the displays can be changed according to gestures made with a user's hand, for example, of enlargement, reduction, and page turning.

To the electronic whiteboard 2a, the USB memory 5a can be connected, and the electronic whiteboard 2a is capable of reading an electronic file from the USB memory 5a and recording an electronic file in the USB memory 5a.

Likewise, to the electronic whiteboard 2b, the USB memory 5b can be connected, and the electronic whiteboard 2b is capable of reading an electronic file from the USB memory 5b and recording an electronic file in the USB memory 5b.

Note that, in the following description, in the case where the electronic whiteboard 2a and the electronic whiteboard 2b do not need to be distinguished, these electronic whiteboards are collectively referred to as simply an "electronic whiteboard 2". Furthermore, a display corresponding to the electronic whiteboard 2 is referred to as a "display 3"; an electronic pen corresponding thereto is referred to as an "electronic pen 4"; a USB memory corresponding thereto is referred to as a "USB memory 5"; a notebook PC corresponding thereto is referred to as a "notebook PC 6"; a videoconference terminal corresponding thereto is referred to as a "videoconference terminal 7"; a hand corresponding thereto is referred to as a "hand H"; and a cable corresponding thereto is referred to as a "cable 10".

Figure 2:
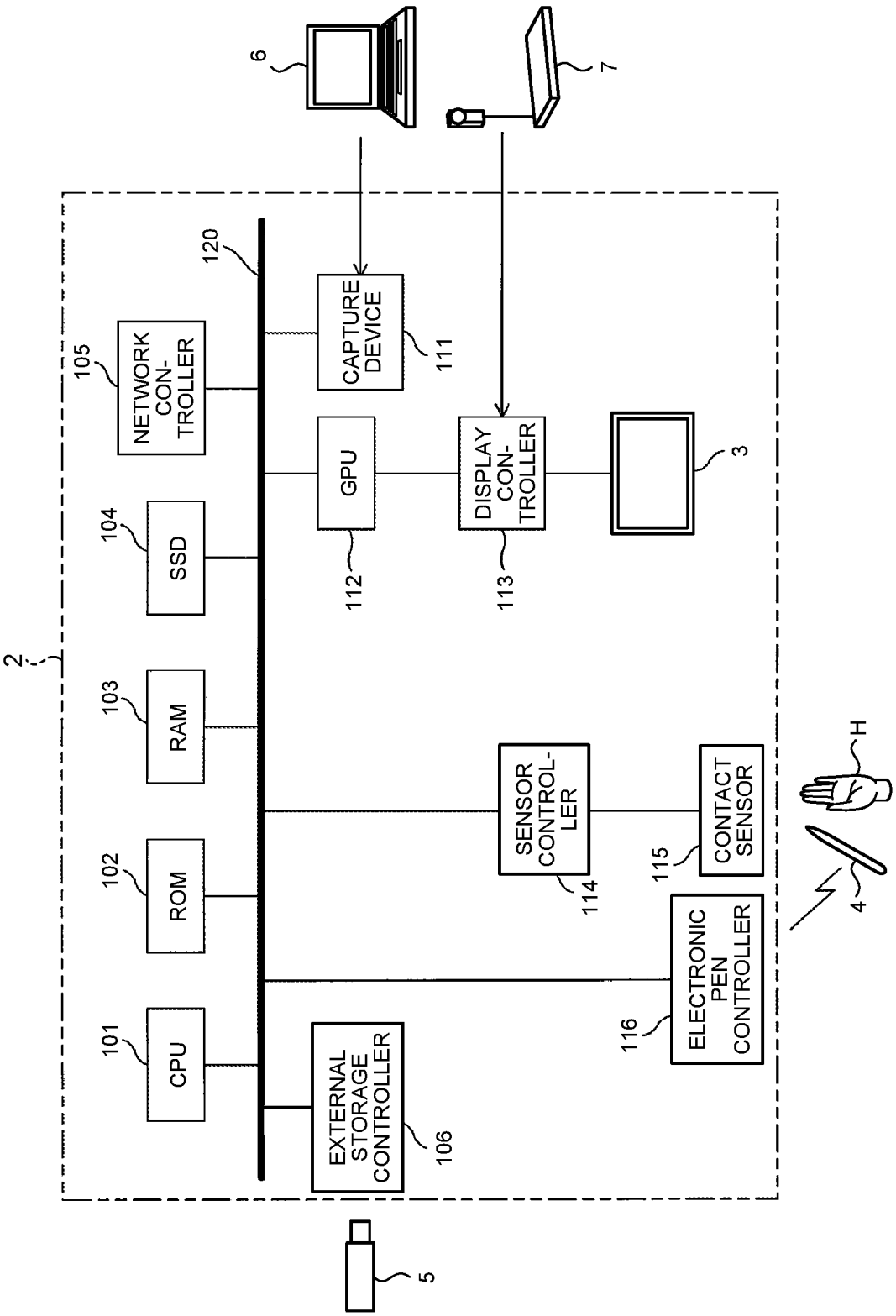
FIG. 2 is a hardware configuration diagram of an electronic whiteboard.

Now, the hardware configuration of the electronic whiteboard 2 is described. FIG. 2 illustrates an example of the hardware configuration of the electronic whiteboard 2.

The electronic whiteboard 2 includes, for example, the display 3, a CPU 101, a ROM 102, a RAM 103, a solid state drive (SSD) 104, a network controller 105, an external storage controller 106, a capture device 111, a graphics processing unit (GPU) 112, a display controller 113, a sensor controller 114, a contact sensor 115, and an electronic pen controller 116. Note that the contact sensor 115 is integrated with the display 3.

The CPU 101 executes a computer program stored in the SSD 104, and controls the overall operation of the electronic whiteboard 2. The ROM 102 is a memory in which a plurality of computer programs and various data are stored. Among the computer programs and the various data, a computer program executed by the CPU 101 and data used in the computer program are copied from the ROM 102 to the SSD 104 when the program is executed by the CPU 101. The RAM 103 is a working memory.

The network controller 105 controls communication with other electronic whiteboards via a communication network 9. The external storage controller 106 controls communication with the USB memory 5. The capture device 111 acquires video information displayed on the display of the notebook PC 6 as a still or moving image. The GPU 112 performs data processing of graphics.

The display controller 113 performs the control and management of the display screen of the display 3, and displays an image output from the GPU 112 and an image output from the videoconference terminal 7 on the display 3.

The contact sensor 115 is a touch panel employing an infrared cut-off method, and detects whether the electronic pen 4 or the user's hand H touches the display 3. Furthermore, the contact sensor 115 detects information about a contact location on the display 3. In the infrared cut-off method, two light emitting/receiving devices (not illustrated) installed at both ends on the upper side of the display 3 emit a plurality of infrared rays in parallel with the display 3, and receive the light reflected by a reflector provided around the display 3 and returning.

The contact sensor 115 outputs the identification (ID) of infrared rays cut off by contact of the electronic pen 4 or the user's hand H with the display 3 as information about a contact location to the sensor controller 114. Then, based on the contact location information from the contact sensor 115, the sensor controller 114 identifies the coordinates of the contact location of the electronic pen 4 or the hand H.

Note that the contact sensor 115 is not limited to the touch panel employing the infrared cut-off method, but various detecting units may be employed, such as an electrostatic capacitance type touch panel that identifies a contact position by detecting a change in electrostatic capacitance, a resistance film type touch panel that identifies a contact position by a change in voltage between two resistance films facing each other, and an electromagnetic induction type touch panel that identifies a contact position by detecting electromagnetic induction generated by contact of a contact object with the display unit.

The electronic pen controller 116 communicates with the electronic pen 4 to determine whether the electronic pen 4 has been pressed against the display 3.

Among the above-mentioned constituents, the CPU 101, the ROM 102, the RAM 103, the SSD 104, the network controller 105, the external storage controller 106, the capture device 111, the GPU 112, the sensor controller 114, and the electronic pen controller 116 are connected to a bus 120 including an address bus and a data bus.

Next, functions of the electronic whiteboard 2 are described. The electronic whiteboard 2 can be a "host device" that is the first to start remote sharing processing, and also can be a "participating device" that participates late in already-started remote sharing processing.

Figure 3:
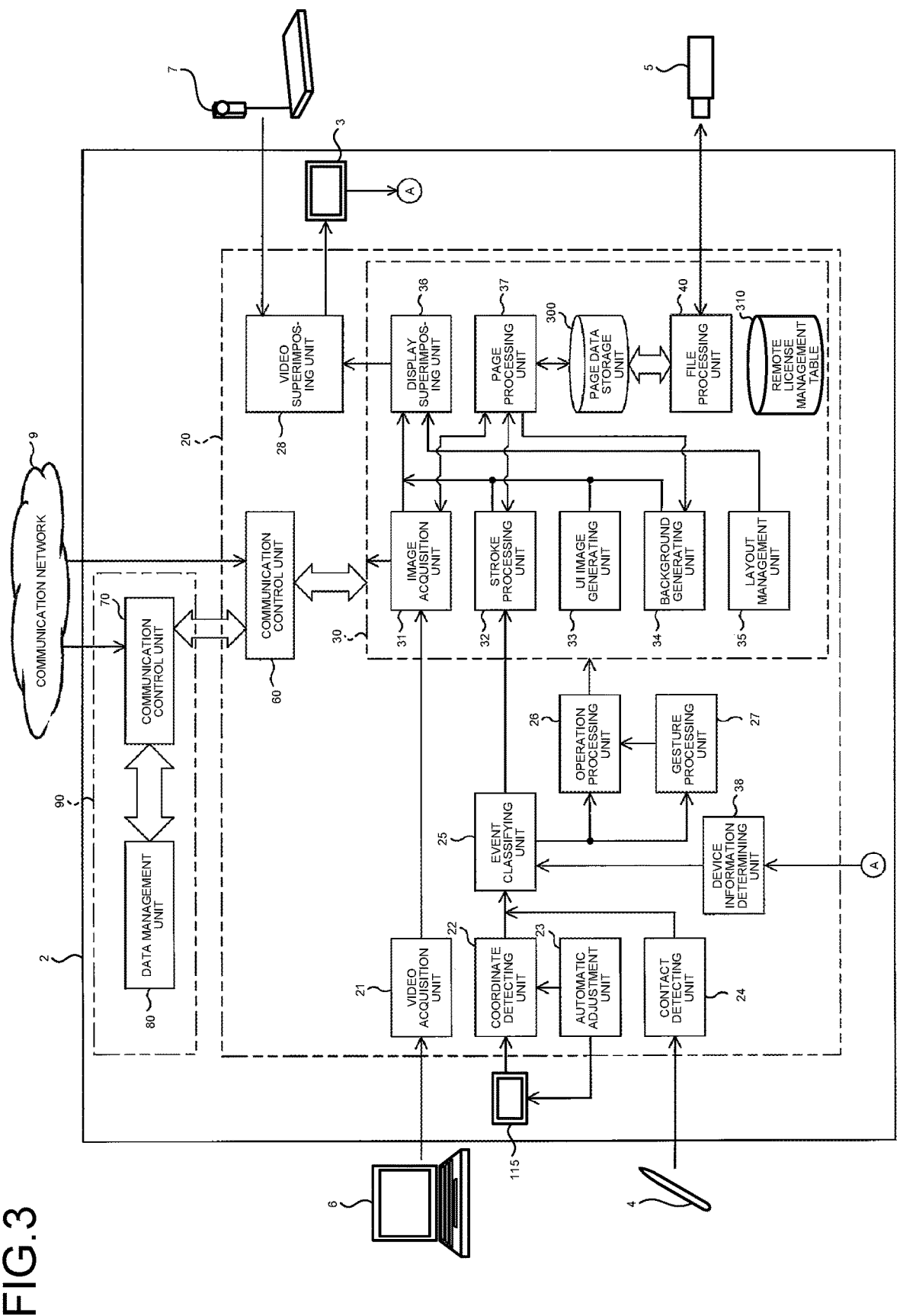
FIG. 3 is a block diagram for describing a function of the electronic whiteboard.

FIG. 3 illustrates the functions of the electronic whiteboard 2. The functions of the electronic whiteboard 2 are broadly classified into a client unit 20 and a server unit 90. The functions of the electronic whiteboard 2 are implemented by the above-described hardware, computer programs, and various data. Specifically, the CPU 101 executes various computer programs stored in, for example, the ROM 102 and the SSD 104.

The client unit 20 and the server unit 90 are functions implemented inside one casing of the electronic whiteboard 2. In the case where the electronic whiteboard 2 serves as a "host device", the function as the client unit 20 and the function as the server unit 90 are implemented in the electronic whiteboard 2. In contrast, in the case where the electronic whiteboard 2 serves as a "participating device", in the electronic whiteboard 2, the client unit 20 is implemented, but the server unit 90 is not implemented.

That is, in the case where the electronic whiteboard 2a serves as a "host device" and the electronic whiteboard 2b serves as a "participating device", the client unit 20 of the electronic whiteboard 2a communicates with the client unit 20 of the other electronic whiteboard 2b via the server unit 90 implemented in the same electronic whiteboard 2a. On the other hand, the client unit 20 of the electronic whiteboard 2b communicates with the client unit of the other electronic whiteboard 2a via the server unit 90 implemented in the other electronic whiteboard 2a.

Functions of the client unit 20 are now described. As illustrated in FIG. 3, the client unit 20 includes a video acquisition unit 21, a coordinate detecting unit 22, an automatic adjustment unit 23, a contact detecting unit 24, an event classifying unit 25, an operation processing unit 26, a gesture processing unit 27, a video superimposing unit 28, an image processing unit 30, a device information determining unit 38, and a communication control unit 60.

The image processing unit 30 includes an image acquisition unit 31, a stroke processing unit 32, a UI image generating unit 33, a background generating unit 34, a layout management unit 35, a display superimposing unit 36, a page processing unit 37, a page data storage unit 300, a remote license management table 310, and a file processing unit 40.

The video acquisition unit 21 acquires a video (hereinafter, also referred to as a "PC output video") output from the notebook PC 6 connected to the electronic whiteboard 2 via the cable 10. Furthermore, the video acquisition unit 21 analyzes the acquired PC output video to extract image information including the resolution of an image frame, that is, a display image in the notebook PC 6, and the frequency of updating the image frame. The PC output video and the image information acquired here are output to the image acquisition unit 31.

When the electronic pen 4 or the user's hand H touches the display 3, the coordinate detecting unit 22 detects the location coordinates of the contact as, for example, an event occurrence location. Furthermore, the coordinate detecting unit 22 also detects the area of the contacted portion of the display 3. These detection results are output to the event classifying unit 25.

The automatic adjustment unit 23 is activated when the electronic whiteboard 2 is powered on, and adjusts various parameters of the contact sensor 115 so that the contact sensor 115 can output an appropriate value to the coordinate detecting unit 22.

The contact detecting unit 24 communicates with the electronic pen 4 to detect whether the electronic pen 4 has been pressed against the display 3. The detection result is output to the event classifying unit 25.

From the display 3, the device information determining unit 38 acquires the model number of the display 3, and determines the model name of the electronic whiteboard 2 from the model number. Then, the device information determining unit 38 outputs the model name of the electronic whiteboard 2 as a determination result to the event classifying unit 25. Note that, as illustrated as an example of "device information" in FIG. 4, the device information determining unit 38 includes a table (model name information) in which the model numbers of the displays 3 are associated with the model names of the electronic whiteboards 2.

The event classifying unit 25 determines the type of an event, based on location coordinates detected by the coordinate detecting unit 22, a detection result in the contact detecting unit 24, and a determination result in the device information determining unit 38. Examples of the event mentioned here include "stroke drawing", "UI operation (user interface operation)", and "gesture operation". Note that, hereinafter, location coordinates detected by the coordinate detecting unit 22 and a detection result in the contact detecting unit 24 are also referred to as "event information".

Figures 4, 5:
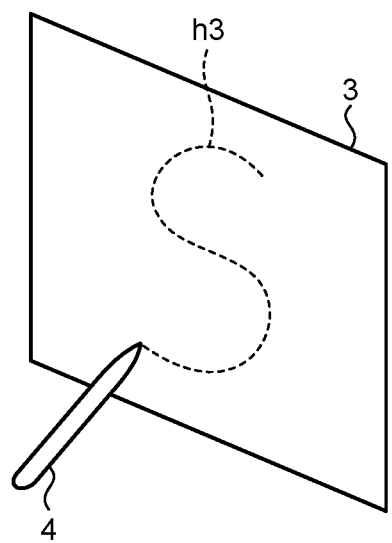
FIG. 4 is a diagram for describing a table in which the model numbers of displays are associated with the model names of electronic whiteboards.
FIG. 5 is a diagram illustrating an example of "stroke drawing" with an electronic pen.

The "stroke drawing" is such an event that a user presses the electronic pen 4 against the display 3, moves the electronic pen 4 with this state being kept, and eventually detaches the electronic pen 4 from the display 3. By such stroke drawing, for example, "S" or "T" in the alphabet is drawn on the display 3. For example, FIG. 5 illustrates an example of the "stroke drawing" with the electronic pen. This example represents an operation in which the electronic pen 4 is pressed against the display 3, and, with this state being kept, the electronic pen 4 is slidingly moved on the display 3 so as to draw "S" in the alphabet. With this operation, "S" in the alphabet is drawn on a movement trajectory h3 of the electronic pen on the display 3.

Note that the "stroke drawing" includes not only drawing a stroke image, but also an event of deleting a stroke image that has been already drawn and an event of editing such stroke image.

Figure 6:
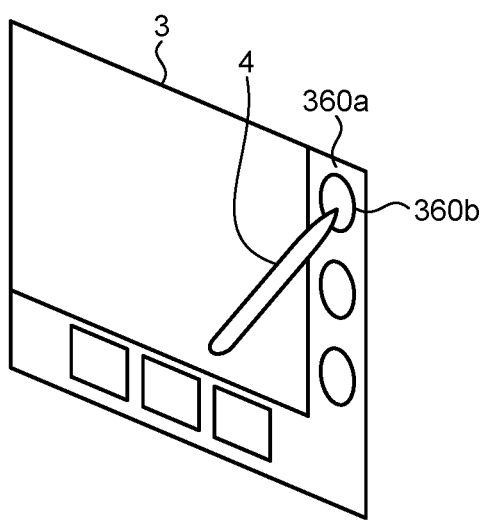
FIG. 6 is a diagram illustrating an example of "UI operation" with an electronic pen.

The "UI operation" is such an event that, when a user interface (UI) image is displayed on the display 3, a user presses a predetermined position with the electronic pen 4 or the hand H. With this "UI operation", for example, the color and the width of a line to be drawn are set. For example, FIG. 6 illustrates an example of the "UI operation" with the electronic pen. This example represents an operation in which the electronic pen 4 touches a user interface element 360b in a UI area (a display area for a user interface image) 360a that is displayed on the display 3. Examples of the user interface element include a button, a list, a check box, and a text box. With this operation, event processing of the element 360b is performed, so that, for example, the color and the width of a line are set.

Figure 7:
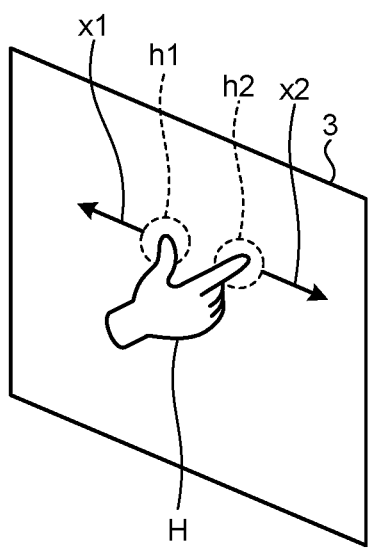
FIG. 7 is a diagram illustrating an example of "gesture operation" by hand.

The "gesture operation" is such an event that a user touches the display 3 by the hand H or moves the hand H on the display 3. With the "gesture operation", for example, a user can enlarge or reduce an image, change a display area, or switch a page, by moving the hand H, with the hand H keeping touching the display 3. For example, FIG. 7 illustrates an example of the "gesture operation" by hand. This example represents a pinch-out operation in which two fingers are pressed against the display 3 and slidingly moved on the display 3 in the respective directions of arrows x1 and x2 so that the fingers become more distant from each other. Dotted line portions h1 and h2 indicate the contact of the two fingers with the display 3. Besides, in the case of using two fingers, a pinch-in operation can be mentioned.

Then, the event classifying unit 25 outputs event information to any of the stroke processing unit 32, the operation processing unit 26, and the gesture processing unit 27, according to the determination result.

Figure 8:
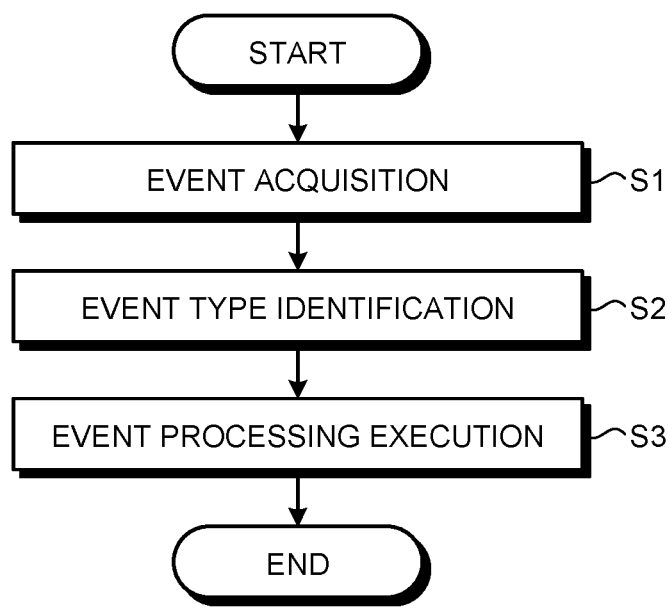
FIG. 8 is a diagram illustrating an example of a flow of image processing executing by a CPU of the electronic whiteboard.

FIG. 8 is a diagram illustrating an example of a flow of image processing executing by the CPU 101 of the electronic whiteboard 2. First, the electronic whiteboard 2 (CPU 101) acquires an event in the display 3 (S1). Subsequently, the electronic whiteboard 2 (CPU 101) refers to device information to identify the type of the above-mentioned event (S2). Subsequently, the electronic whiteboard 2 (CPU 101) performs event processing according to the result of the above-described identification (S3).

Figure 9:
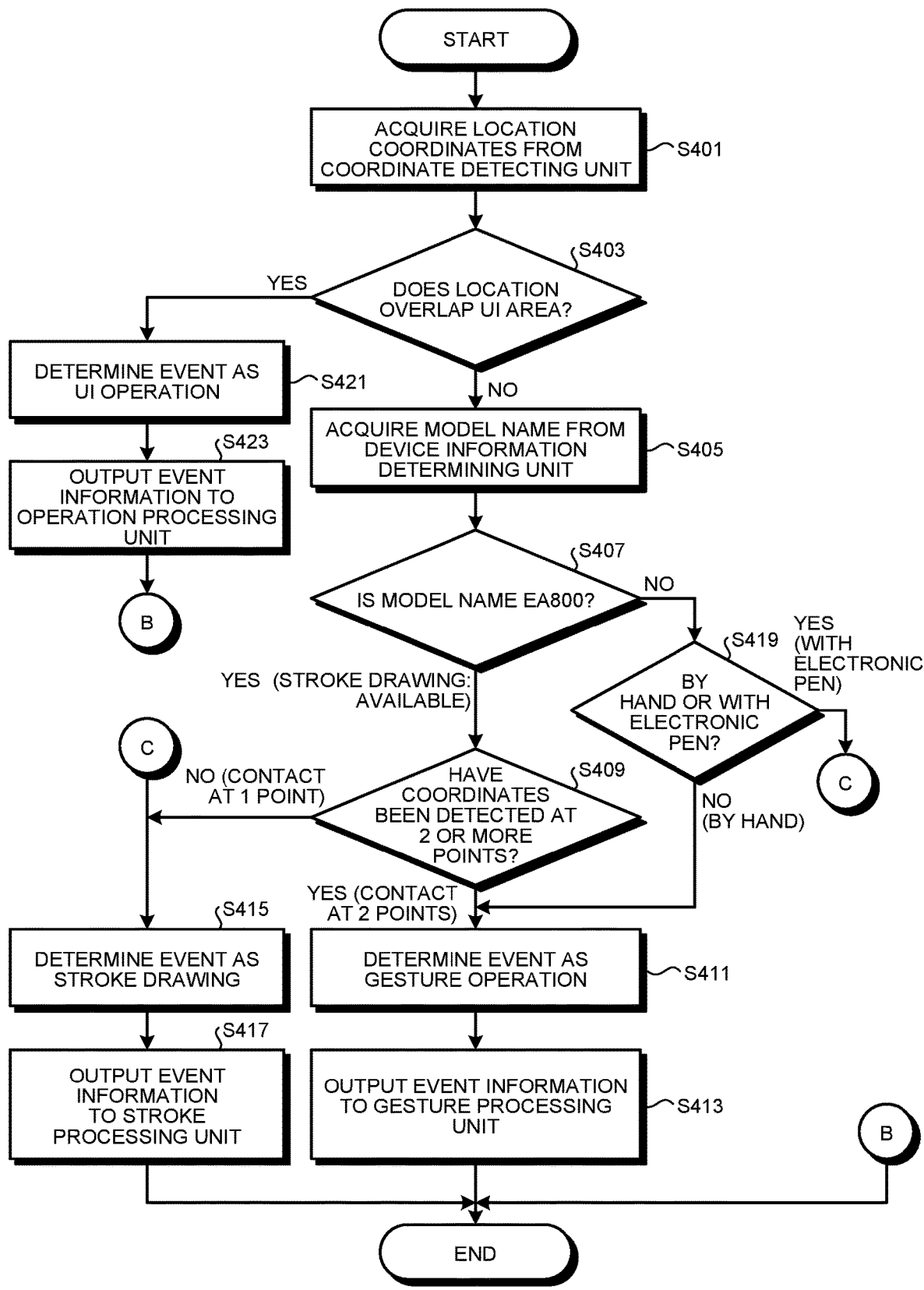
FIG. 9 is a flowchart for describing processing in an event classifying unit.

Next, processing by the event classifying unit 25 in the above-described image processing flow (hereinafter, also referred to as "event classifying processing") is described using the flowchart in FIG. 9. At the first Step S401, location coordinates (an event occurrence location) are acquired from the coordinate detecting unit 22.

Figure 11:
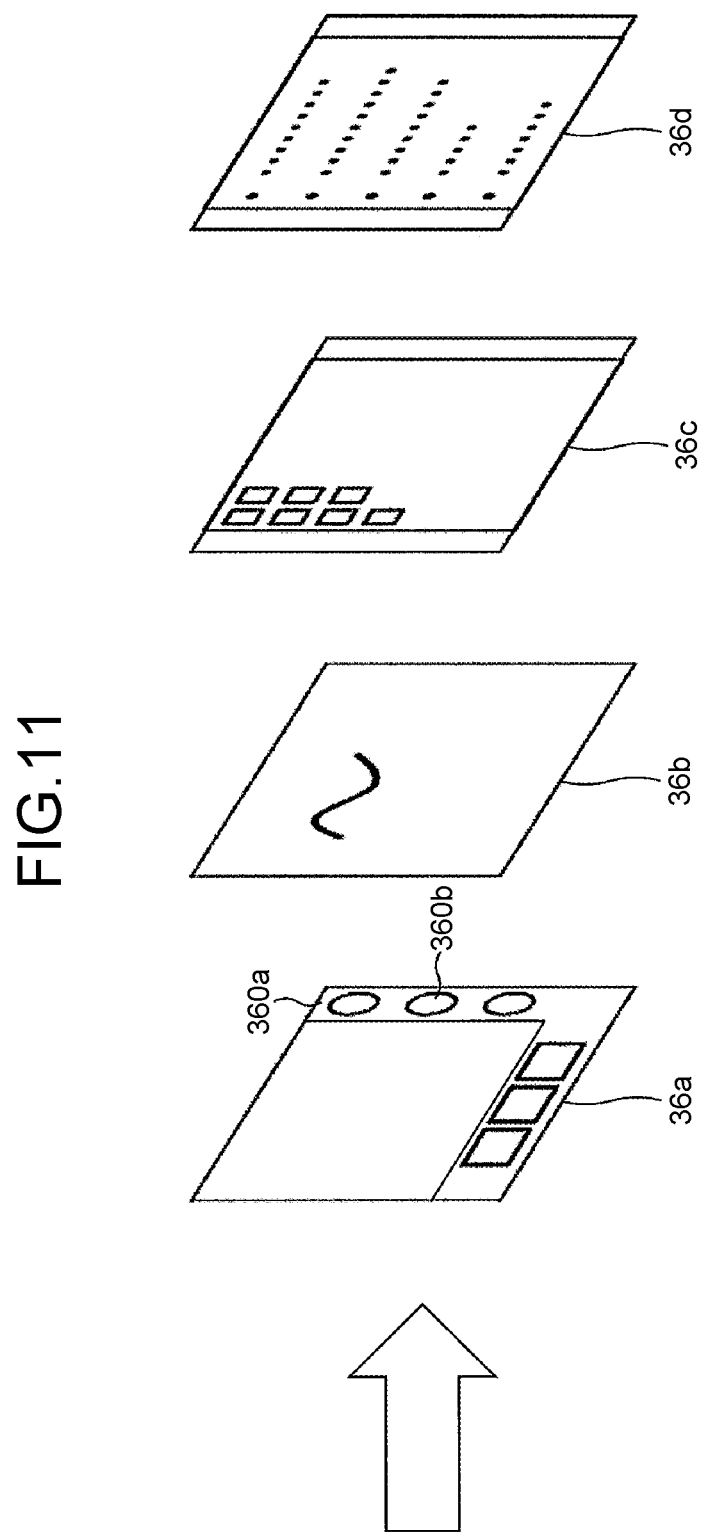
FIG. 11 is a diagram for describing the superimposition of a plurality of images.

At subsequent Step S403, it is determined whether the location overlaps the UI area 360a (refer to FIG. 11). The UI area 360a denotes an area in which the user interface elements (such as a button, a list, a check box, and a text box) 360b (refer to FIG. 11) are displayed on the display screen. If the location does not overlap the UI area 360a, the determination result here is negative, and the processing proceeds to Step S405.

At Step S405, the model name of the electronic whiteboard 2 is acquired from the device information determining unit 38.

At subsequent Step S407, it is determined whether the model name of the electronic whiteboard 2 is "EA800". If the model name of the electronic whiteboard 2 is "EA800", the determination result here is positive since stroke drawing by a user's hand is available, and the processing proceeds to Step S409.

At Step S409, it is determined whether the coordinates of two or more points are detected. If the coordinates of two or more points are detected, the determination result here is positive, and the processing proceeds to Step S411.

At Step S411, the event is determined as "gesture operation".

At subsequent Step S413, event information is output to the gesture processing unit 27. Then, the event classifying processing is terminated.

If the coordinates of one point are detected at the above-described Step S409, the determination result at Step S409 is negative, and the processing proceeds to Step S415.

At Step S415, the event is determined as "stroke drawing".

At subsequent Step S417 event information is output to the stroke processing unit 32. Then, the event classifying processing is terminated.

If, at the above-mentioned Step S407, the model name of the electronic whiteboard 2 is not "EA800", the determination result at Step S407 is negative since stroke drawing by a user's hand is not available, and the processing proceeds to Step S419.

At Step S419, it is determined, from the result of detection by the contact detecting unit 24, whether the electronic pen 4 has been pressed. If the electronic pen 4 has not been pressed, the determination result here is negative, and the processing proceeds to the above-described Step S411. On the other hand, if the electronic pen 4 has been pressed, the determination result here is positive, and the processing proceeds to the above-described Step S415.

If, at the above-described Step S403, the location overlaps the UI area 360a, the determination result at Step S403 is positive, and the processing proceeds to Step S421.

At Step S421, the event is determined as "UI operation".

At subsequent Step S423, event information is output to the operation processing unit 26. Then, the event classifying processing is terminated.

Referring back to FIG. 3, the operation processing unit 26 receives event information determined as "UI operation" by the event classifying unit 25, and performs an operation corresponding to the element of the UI on which the event occurs.

The gesture processing unit 27 receives event information determined as "gesture operation" by the event classifying unit 25, and performs an operation according to the event information.

The stroke processing unit 32 receives the event information identified as "stroke drawing" by the event classifying unit 25, and draws an image (stroke image) by stroke, deletes a stroke image that has been already drawn, and edits a stroke image that has been already drawn. Each result of the drawing, deletion, editing of a stroke image is output to the display superimposing unit 36 and the page processing unit 37, and stored, as operation data, in an operation data storage unit 840 of a data management unit 80 (refer to FIG. 20).

The video superimposing unit 28 displays images superimposed by the display superimposing unit 36 (hereinafter, abbreviated as "superimposed image") on the display 3. Furthermore, the video superimposing unit 28 displays the superimposed image on the entirety of the display, and, at the same time, displays a video sent from the videoconference terminal 7 on a part of the display 3, separately (in a picture-in-picture fashion). Furthermore, the video superimposing unit 28 performs a display change to display a separately displayed video on the entirety of the display 3.

The image acquisition unit 31 acquires, as an image, frame information included in a PC output video from the video acquisition unit 21, and outputs the frame information to the display superimposing unit 36 and the page processing unit 37. Note that, hereinafter, an image acquired by the image acquisition unit 31 is also referred to as a "PC output image" for convenience.

The UI image generating unit 33 generates a predetermined UI image, and outputs the UI image to the display superimposing unit 36.

The background generating unit 34 receives, from the page processing unit 37, media data included in page data read from the page data storage unit 300 by the page processing unit 37, and outputs the media data to the display superimposing unit 36. The pattern of a background image is, for example, a solid color or grid pattern.

The layout management unit 35 manages information about the layouts of images (hereinafter, abbreviated as "layout information") output from the image acquisition unit 31, the stroke processing unit 32, and the UI image generating unit 33 or the background generating unit 34. The layout information is output to the display superimposing unit 36.

Thus, the layout management unit 35 can instruct the display superimposing unit 36 where to display a PC output image and a stroke image in a UI image and a background image or not to display a PC output image and a stroke image.

Based on the layout information from the layout management unit 35, the display superimposing unit 36 lays out the images output from the image acquisition unit 31, the stroke processing unit 32, and the UI image generating unit 33 or the background generating unit 34.

The page processing unit 37 integrates data on the stroke image and data on the PC output image into one page data, and stores the resultant page data in the page data storage unit 300.

FIG. 10 illustrates an example of the page data. The page data includes a page data ID, a start time, a finish time, a stroke array data ID, and a media data ID.

The page data ID is an ID for identifying a page. The start time is the time to start the display of the page. The finish time is the time to finish the update of the page data. The stroke array data ID is an ID for identifying stroke array data generated through a stroke event with the electronic pen 4 or the hand H. The media data ID is an ID for identifying media data. The stroke array data is data for displaying a stroke image on the display 3. The media data is data for displaying a background image on the display 3.

Data on a stroke image constitutes part of page data, as stroke array data associated with a stroke array data ID. Data on a PC output image constitutes part of page data, as media data associated with a media data ID. Then, the media data, when read from the page data storage unit 300, is treated as data on a background image.

When the page processing unit 37 transmits the media data of the once stored page data to the display superimposing unit 36 via the background generating unit 34, the video superimposing unit 28 can redisplay the background image on the display 3.

Furthermore, when the page processing unit 37 returns the stroke array data of the once stored page data to the stroke processing unit 32, a state is brought about in which the stroke can be re-edited. Furthermore, the page processing unit 37 is also capable of deleting or replicating the page data.

In other words, data on a PC output image displayed on the display 3 at the time when the page processing unit 37 stores page data in the page data storage unit 300 is once stored in the page data storage unit 300, and subsequently, the PC output image data, when read from the page data storage unit 300, is read as media data representing a background image.

Then, among the page data read from the page data storage unit 300, the page processing unit 37 outputs the stroke array data representing a stroke image to the stroke processing unit 32. Furthermore, among the page data read from the page data storage unit 300, the page processing unit 37 outputs the media data representing a background image to the background generating unit 34.

The display superimposing unit 36 superimposes the PC output image from the image acquisition unit 31, the stroke image from the stroke processing unit 32, the UI image from the UI image generating unit 33, and the background image from the background generating unit 34, according to the layout specified by the layout management unit 35. Here, as illustrated in FIG. 11, a layer structure is formed in which a UI image layer 36a, a stroke image layer 36b, a PC output image layer 36c, and a background image layer 36d are superimposed on top of one another so that the UI image, the stroke image, the PC output image, and the background image are viewed from the user in this order when these images overlap each other.

Furthermore, the display superimposing unit 36 is also capable of switching between the PC output image and the background image so that these images are exclusively superimposed upon the UI image and the stroke image. For example, when the cable 10 between the electronic whiteboard 2 and the notebook PC 6 is pulled out in a state where the UI image, the stroke image, and the PC output image are displayed at first, according to an instruction from the layout management unit 35, the display superimposing unit 36 can remove the PC output image from superimposition targets and display the background image. Furthermore, the display superimposing unit 36 also can enlarge a display, reduce a display, and move a display area.

Figure 12:
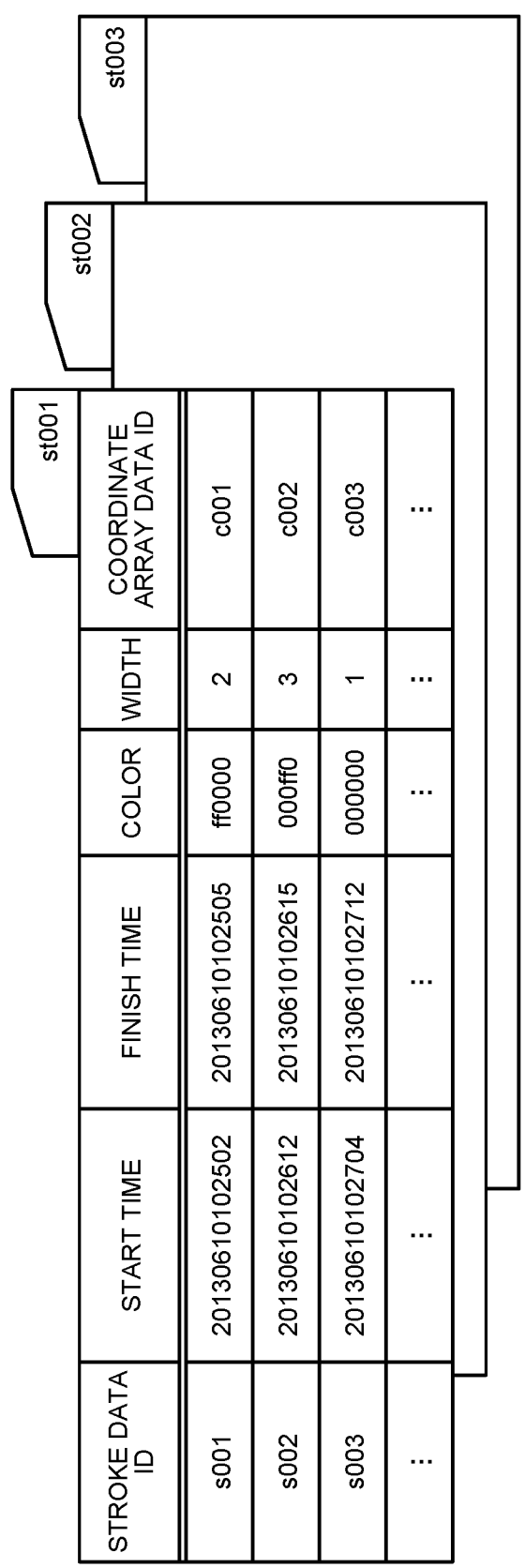
FIG. 12 is a diagram for describing stroke data.

FIG. 12 illustrates an example of the stroke array data. One piece of stroke array data is constituted by a plurality of pieces of stroke data. A piece of stroke data is generated for every stroke event.

For example, in the case where a user draws "S" in the alphabet with the electronic pen 4, the drawing is one-stroke drawing, and hence, the single letter "S" in the alphabet is represented by one stroke data ID. On the other hand, in the case where a user draws "T" in the alphabet with the electronic pen 4, the drawing is two-stroke drawing, and hence, the single letter "T" in the alphabet is represented by two stroke data IDs.

Each piece of stroke data includes a stroke data ID, a start time, a finish time, a color, a width, and a coordinate array data ID.

The stroke data ID is an ID for identifying the stroke data. The start time is the time to start drawing the stroke. The finish time is the time to finish drawing the stroke. The color is the color of the stroke, and the width is the width of the stroke. The coordinate array data ID is an ID for identifying coordinate array data including information about transit points of the stroke.

Figure 13:
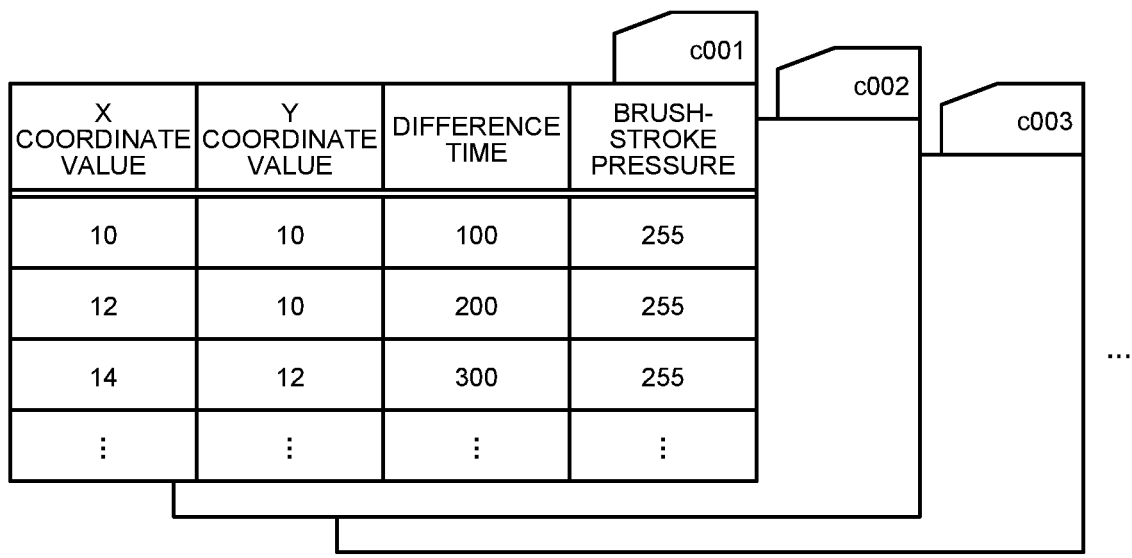
FIG. 13 is a diagram for describing coordinate array data.

FIG. 13 illustrates an example of the coordinate array data. The coordinate array data includes information about a plurality of points (transit points) through which a stroke has passed, specifically, a location (X coordinate value, Y coordinate value) of each transit point on the display 3, the time difference (msec) between the time when the stroke has passed the location and the start time of the stroke, and the brushstroke pressure of the electronic pen 4 at the location. For example, in the case where a user draws "S" in the alphabet with the electronic pen 4, the drawing is one-stroke drawing, and the drawing passes through a plurality of transit points until the user completes the drawing of "S", and hence, the coordinate array data includes information about these transit points.

FIG. 14 illustrates an example of the media data. Each media data includes a media data ID, a data type, a recorded time, an X coordinate value, a Y coordinate value, a width, a height, and data.

The media data ID is an ID for identifying the media data. The data type is the type of the media data. The recorded time is the time when page data from the page processing unit 37 is stored in the page data storage unit 300. The X coordinate value and the Y coordinate value indicate the location of an image displayed on the display 3 according to the page data. The width and the height indicate the size of an image. The data indicates the contents of the media data.

In particular, the location of an image displayed on the display 3 according to the page data is a location of the upper left end of the image displayed according to the page data, where the coordinates of the upper left end of the display 3 are (X coordinate value, Y coordinate value)=(0, 0).

Referring back to FIG. 3, the remote license management table 310 manages license data necessary for executing remote sharing processing.

FIG. 15 illustrates an example of a remote license management table. The remote license management table includes a product ID, a license ID, and an expiration date. The product ID is the product ID of the electronic whiteboard 2. The license ID is an ID used for authentication, and the expiration date is a license expiration date.

Figure 16:
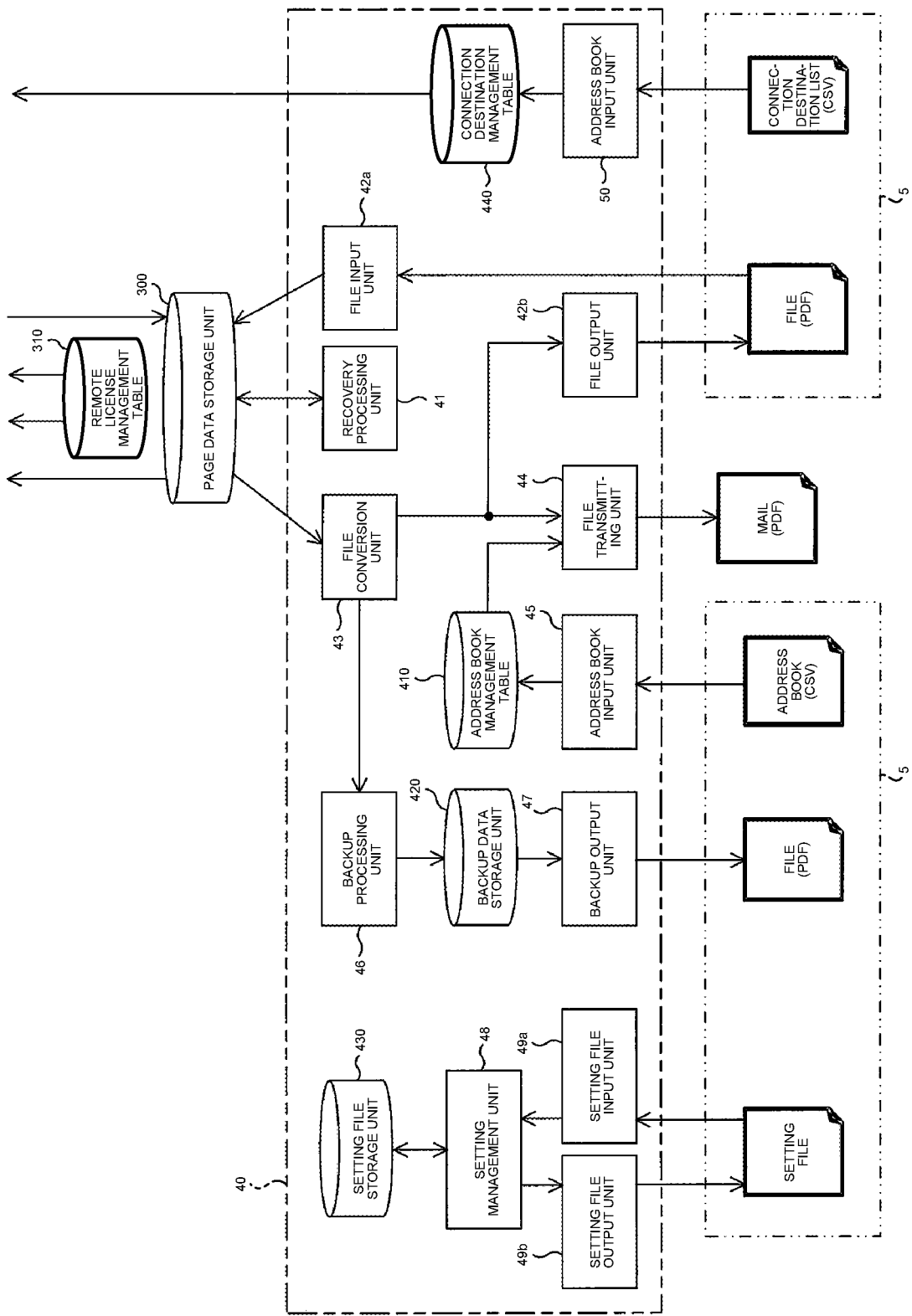
FIG. 16 is a block diagram for describing functions of a file processing unit.

Next, functions of the file processing unit 40 are described. FIG. 16 is a functional block diagram of the file processing unit 40.

The file processing unit 40 includes a recovery processing unit 41, a file input unit 42a, a file output unit 42b, a file conversion unit 43, a file transmitting unit 44, an address book input unit 45, a backup processing unit 46, a backup output unit 47, a setting management unit 48, a setting file output unit 49b, a setting file input unit 49a, and an address book input unit 50.

The file processing unit 40 includes an address book management table 410, a backup data storage unit 420, a setting file storage unit 430, and a connection destination management table 440.

In the case where the electronic whiteboard 2 is terminated abnormally due to power shutdown, when the power is subsequently turned on, the recovery processing unit 41 detects the abnormal termination and recovers page data.

For example, in the case where the electronic whiteboard 2 is terminated normally, page data is recorded as a PDF file in the USB 5 via the file processing unit 40. In contrast, in the case of the abnormal termination, page data remains recorded in the page data storage unit 300. Therefore, when the power is subsequently turned on, the recovery processing unit 41 reads the page data from the page data storage unit 300 to recovery the page data.

The file conversion unit 43 converts page data stored in the page data storage unit 300 into a PDF file. Note that, in the case where a plurality of pieces of page data is stored in the page data storage unit 300, the plurality of pieces of page data may be converted into a plurality of PDF files, individually, that is, per page unit, or may be collectively converted into one PDF file. The PDF file converted here is output to the backup processing unit 46.

The file input unit 42a reads a PDF file from the USB memory 5, and stores each page as page data in the page data storage unit 300. Note that, in the case where a plurality of PDF files is stored in the USB memory 5, the file input unit 42a reads all of the PDF files.

The file output unit 42b stores a PDF file output from the file conversion unit 43 in the USB memory 5.

The file transmitting unit 44 attaches a PDF file output from the file conversion unit 43 to an electronic mail to transmit the file. Here, according to the contents of the address book management table 410 displayed on the display 3 by the display superimposing unit 36, a user operates an input device such as a touch panel so that the file transmitting unit 44 receives the selection of a transmission destination, whereby a file transmission destination is determined.

FIG. 17 illustrates an example of the address book management table 410. The name and the mail address of a transmission destination are associated with each other and stored in the address book management table 410.

Furthermore, by the user's operation of an input device such as a touch panel, the file transmitting unit 44 can also receive the input of a mail address as a transmission destination.

The address book input unit 45 reads a list file of mail addresses (an address book) from the USB memory 5, and stores the list in the address book management table 410.

The backup processing unit 46 stores a file output from the file output unit 42b and a file transmitted from the file transmitting unit 44 in the backup data storage unit 420 to perform backup processing.

FIG. 18 illustrates an example of backup data.

Backup data is stored as a file in a PDF (a PDF file). Note that this backup process is performed when a setting "backup is available" is made by a user, and in contrast, the backup process is not performed when such setting is not made.

The backup output unit 47 stores a backed-up file in the USB memory 5. Note that, at the time of this storing, a user is required to input a password by operation of an input device, such as a touch panel, in order to ensure security. The file stored in the USB memory 5 can be read by the file input unit 42a.

The setting management unit 48 stores various types of setting information on the electronic whiteboard 2 in the setting file storage unit 430, and reads the various setting information from the setting file storage unit 430. Examples of the various types of setting information include information about a network, dates and times, areas and languages, information about a mail server, an address book, a connection destination list, and information about a backup. Note that examples of the information about a network include the IP address of the electronic whiteboard 2, a net mask, a default gateway, and a domain name system (DNS).

The setting file output unit 49b stores the above-mentioned various setting information on the electronic whiteboard 2 as a setting file in the USB memory 5. Note that, from a security standpoint, a user cannot see the contents of the setting file.

The setting file input unit 49a reads a setting file from the USB memory 5, and outputs the contents of the setting file to the setting management unit 48. With this, various types of setting information are reflected in various settings on the electronic whiteboard 2.

The address book input unit 50 reads, from the USB memory 5, a connection destination list, that is, a list of connection destination IP addresses for remote sharing processing (for example, a CVS-format electronic file), and stores the list in the connection destination management table 440.

The connection destination management table 440 is a table in which the IP address of the electronic whiteboard 2 is stored beforehand in order to save a user from having to input the IP address of a host device (an electronic whiteboard that starts remote sharing processing), in the case where the electronic whiteboard 2 is a participating device (an electronic whiteboard that participates late in the already-started remote share processing).

FIG. 19 illustrates an example of the connection destination management table 440. The names and the IP addresses of the electronic whiteboards 2 functioning as a host device are associated with each other and listed in the connection destination management table 440. In the example in FIG. 19, as the name of the electronic whiteboard 2, the name of a place in which the electronic whiteboard 2 is installed is used.

Note that, instead of using the connection destination management table 440, the user of a participating device may input the IP address of a host device each time by operating an input device, such as a touch panel. In this case, the user of the participating device needs to know the IP address of the host device by telephone, electronic mail, or the like from the user of the host device.

Next, functions of the communication control unit 60 are described.

Figure 20:
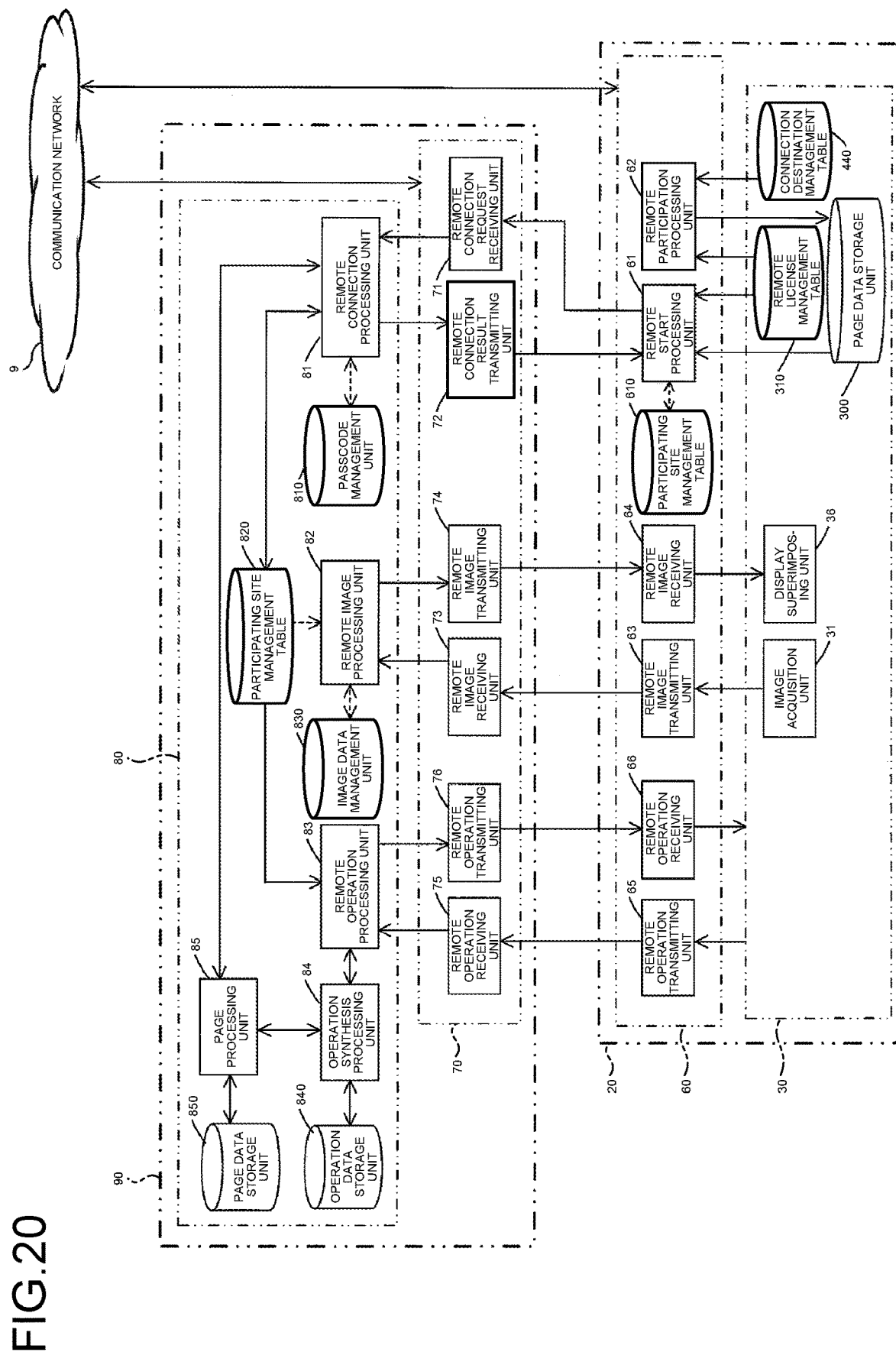
FIG. 20 is a block diagram for describing functions of a server unit and a transmission control unit.

The communication control unit 60 controls communication performed via the communication network 9 with other electronic whiteboards 2, and communication with a communication control unit 70 of the server unit 90. As illustrated in FIG. 20, the communication control unit 60 includes a remote start processing unit 61, a remote participation processing unit 62, a remote image transmitting unit 63, a remote image receiving unit 64, a remote operation transmitting unit 65, a remote operation receiving unit 66, and a participating site management table 610.

The remote start processing unit 61 makes a request to the server unit 90 of the same electronic whiteboard 2 for the new start of remote sharing processing, and receives the result of the request from the server unit 90. Note that, prior to making such request, the remote start processing unit 61 refers to the remote license management table 310 to check whether license information (the product ID, the license ID, and the expiration date of the electronic whiteboard 2) is managed. Then, if license information is managed, the remote start processing unit 61 can make a request for the start of remote sharing processing, but, if license information is not managed, the remote start processing unit 61 cannot make a request for the start of remote sharing processing.

The participating site management table 610 is such a table that, when an electronic whiteboard serves as a host device, manages an electronic whiteboard serving as a participating device that is presently participating in remote sharing processing. FIG. 21 illustrates an example of the participating site management table 610. The names and IP addresses of electronic whiteboards 2 each serving as a participating device are associated with each other, and listed in the participating site management table 610. In the example in FIG. 21, as the name of the electronic whiteboard 2, the name of a place in which the electronic whiteboard 2 is installed is used.

Via the communication network 9, the remote participation processing unit 62 makes a request to a remote connection request receiving unit 71 of the server unit 90 in a host device (an electronic whiteboard 2 that starts remote sharing processing) for participation in remote sharing processing, and receives the result of the request from the server unit 90. Note that, prior to making such request, the remote participation processing unit 62 refers to the remote license management table 310.

Furthermore, when participating in already-started remote sharing processing, the remote participation processing unit 62 refers to the connection destination management table 440 to acquire the IP address of a host device. Note that, instead of the reference made to the connection destination management table 440 by the remote participation processing unit 62, a user may input the IP address of the host device each time by operating an input device, such as a touch panel.

The remote image transmitting unit 63 transmits a PC output image from the image acquisition unit 31 to a remote image receiving unit 73 of the server unit 90.

The remote image receiving unit 64 receives data on a PC output image in another electronic whiteboard 2 from a remote image transmitting unit 74 of the server unit 90, and outputs the data to the display superimposing unit 36. This allows remote sharing processing.

The remote operation transmitting unit 65 transmits various operation data necessary for remote sharing processing to a remote operation receiving unit 75 of the server unit 90. Examples of the various operation data include data concerning: addition of a stroke image, deletion of a stroke image, editing (enlargement, reduction, or movement) of a stroke image, storage of page data, preparation of page data, duplication of page data, deletion of page data, and presentation page switching.

The remote operation receiving unit 66 receives, from a remote operation transmitting unit 76 of the server unit 90, operation data input by another electronic whiteboard 2, and outputs the data to the image processing unit 30. This causes remote sharing processing.

Next, functions of the server unit 90 are described. The server unit 90 is provided in each of the electronic whiteboards 2, and any of the electronic whiteboards 2 can play a role as a server unit. As illustrated in FIG. 20, the server unit 90 can be roughly classified into the communication control unit 70 and the data management unit 80.

The server unit 90 includes units for storing and managing various data, namely, a passcode management unit 810, a participating site management table 820, an image data management unit 830, the operation data storage unit 840, and a page data storage unit 850.

First, functions of the communication control unit 70 are described. The communication control unit 70 controls (1) communication with a communication control unit 60 of a client unit 20 in the same electronic whiteboard 2, and (2) communication via the communication network 9 with a communication control unit 60 of a client unit 20 in another electronic whiteboard 2.

The communication control unit 70 includes the remote connection request receiving unit 71, a remote connection result transmitting unit 72, the remote image receiving unit 73, the remote image transmitting unit 74, the remote operation receiving unit 75, and the remote operation transmitting unit 76.

The remote connection request receiving unit 71 receives a request for the start of remote sharing processing from the remote start processing unit 61, and receives a request for participation in remote sharing processing from the remote participation processing unit 62 of another electronic whiteboard 2 via the communication network 9.

The remote connection result transmitting unit 72 transmits the result of a request for the start of remote sharing processing to the remote start processing unit 61, and transmits the result of a request for participation in remote sharing processing to the remote participation processing unit 62 of another electronic whiteboard 2 via the communication network 9.

The remote image receiving unit 73 receives data on a PC output image from the remote image transmitting unit 63, and transmits the data to a remote image processing unit 82. The remote image transmitting unit 74 receives data on a PC output image from the remote image processing unit 82, and transmits the data to the remote image receiving unit 64.

The remote operation receiving unit 75 receives operation data from the remote operation transmitting unit 65, and transmits the data to a remote operation processing unit 83. When receiving the operation data from the remote operation processing unit 83, the remote operation transmitting unit 76 transmits the operation data to the remote operation receiving unit 66.

Next, functions of the data management unit 80 are described. As illustrated in FIG. 20, the data management unit 80 includes a remote connection processing unit 81, the remote image processing unit 82, the remote operation processing unit 83, an operation synthesis processing unit 84, and a page processing unit 85.

The remote connection processing unit 81 performs the start and termination of remote sharing processing. Furthermore, the remote connection processing unit 81 checks whether a license is present and the license is within the validity period, based on license information that the remote connection request receiving unit 71 receives from the remote start processing unit 61 together with a request for the start of remote sharing processing, or license information that the remote connection request receiving unit 71 receives from the remote participation processing unit 62 together with a request for participation in remote sharing processing.

Furthermore, the remote connection processing unit 81 checks whether the number of requests for the participation from other electronic whiteboards 2 as client units does not exceed a predetermined number of participable devices.

In the case where an electronic whiteboard has no effective license or the number of the requests for the participation exceeds the number of participable devices, the remote connection processing unit 81 denies the request for participation in remote sharing processing.

Furthermore, the remote connection processing unit 81 determines whether a passcode transmitted from another electronic whiteboard 2 together with the request for the participation in remote sharing processing matches a passcode managed in the passcode management unit 810, and only in the case where the passcodes match, the remote connection processing unit 81 permits the electronic whiteboard 2 to participate in the remote sharing processing.

A passcode is issued by the remote connection processing unit 81 when remote sharing processing is newly started, and the passcode is managed in the passcode management unit 810. The user of a participating device who intends to participate in remote sharing processing acquires a passcode by telephone, electronic mail, or the like from the user of a host device. By inputting the acquired passcode to the participating device with an input device, such as a touch panel, the user of the participating device can make a request for participation in the remote sharing processing. Note that, in the case where priority is given to the user's usability over security, only the status of the license is checked and the check of the passcode may be omitted.

In the case where an electronic whiteboard 2 is a host device, the remote connection processing unit 81 stores, in the participating site management table 820, participating site information included in a participation request sent from the remote participation processing unit 62 of a participating device via the communication network 9.

Furthermore, the remote connection processing unit 81 reads remote site information stored in the participating site management table 820, and transmits the information to the remote connection result transmitting unit 72.

The remote connection result transmitting unit 72 transmits the remote site information to the remote start processing unit 61 in the client unit 20 of the same host device.

The remote start processing unit 61 stores the remote site information in the participating site management table 610. With this, in the host device, the remote site information is managed by both the client unit 20 and the server unit 90.

When receiving data on PC output images of electronic whiteboards 2 (including both a host device and a participating device) that participate in remote sharing processing, the remote image processing unit 82 stores the data in the image data management unit 830, and, according to the order of arrival time of the image data at the server unit 90 of its own electronic whiteboard 2 serving as a host device, the remote image processing unit 82 determines the order in which the image data to be subject to remote sharing processing is displayed.

Furthermore, the remote image processing unit 82 refers to the participating site management table 820, and transmits the image data in the order determined above to the client units 20 of all the electronic whiteboards 2 presently participating in remote sharing processing (including the client unit of its own electronic whiteboard as a host device) via the remote image transmitting unit 74 of the communication control unit 70.

The remote operation processing unit 83 receives various operation data of electronic whiteboards 2 (including both a host device and a participating device) presently participating in remote sharing processing, and determines the order in which images to be subject to remote sharing processing are displayed, according to the order of arrival time of the data at the server unit 90 of its own electronic whiteboard 2 serving as the host device.

Note that the various operation data is the same as the above-described various operation data. Furthermore, the remote operation processing unit 83 refers to the participating site management table 820, and transmits operation data to the client units 20 of all the electronic whiteboards 2 presently participating in the remote sharing processing (including both a host device and a participating device).

The operation synthesis processing unit 84 synthesizes operation data of electronic whiteboards 2 output from the remote operation processing units 83, and stores the operation data obtained as a synthesis result in the operation data storage unit 840, and also returns the data to the remote operation processing unit 83. The operation data returned to the remote operation processing unit 83 transmits to the client unit 20 of a host device and the client unit 20 of a participating device via the remote operation transmitting unit 76. With this, the same image according to the operation data to be displayed in each of the electronic whiteboards 2.

FIG. 22 illustrates an example of operation data. In the operation data, a sequence (SEQ), the operation name of the operation data, the IP address of an electronic whiteboard 2 serving as a transmission source of the operation data and the port number of a client or server unit thereof, the IP address of an electronic whiteboard 2 serving as a destination of operation data and the port number of a client or server unit thereof, the operation type of the operation data, an operation target of the operation data, and data indicating the contents of an operation are associated with each other.

For example, operation data SEQ1 indicates that a stroke drawing has been made in a client unit (port number: 50001) of an electronic whiteboard (IP address: 192.0.0.1) serving as a host device, and operation data has been transmitted to a server unit (port number: 50000) of the electronic whiteboard (IP address: 192.0.0.1) serving as the same host device. At this time, the operation type is "STROKE", the operation target is "page data ID: p005", and the data indicating the contents of the operation is "stroke data".

Operation data SEQ2 indicates that the operation data has been transmitted from the server unit (port number: 50000) of the electronic whiteboard (IP address: 192.0.0.1) serving as the host device to a client unit (port number: 50001) of another electronic whiteboard (IP address: 192.0.0.2) serving as a participating device.

Note that, in order to synthesize operation data in the input order, the operation synthesis processing unit 84 displays stroke images in the displays 3 of all the electronic whiteboards 2 participating in remote sharing processing, in the order in which the users of electronic whiteboards 2 have made their strokes, unless the communication network 9 is busy.

The page processing unit 85 has the same function as that of the page processing unit 37 in the image processing unit 30 of the client unit 20, and accordingly stores page data in the page data storage unit 850. Note that, since the page data storage unit 850 has the same function as that of the page data storage unit 300 in the image processing unit 30, a description thereof will be omitted.

Figure 23:
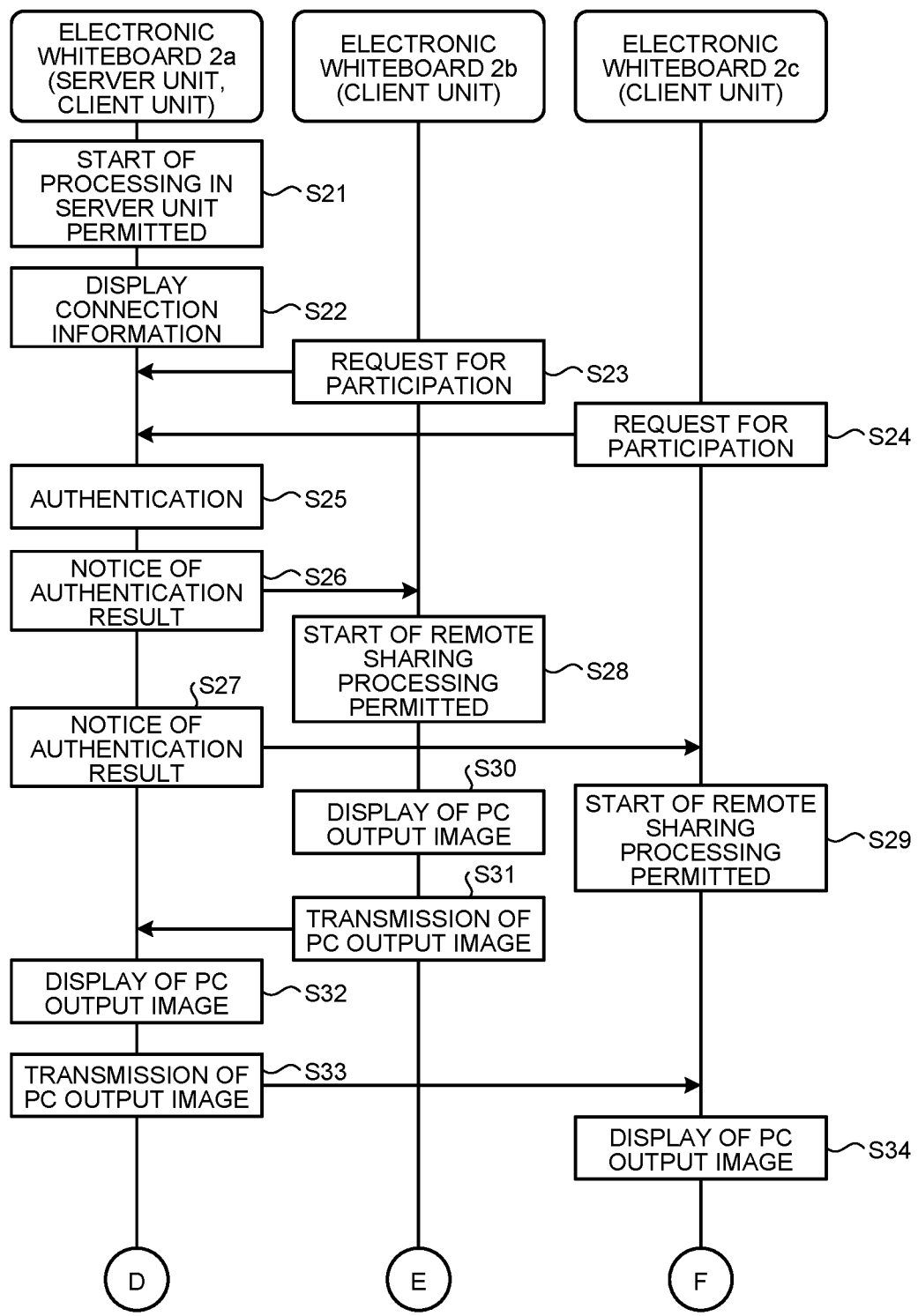
FIG. 23 is a (first) sequence diagram for describing remote sharing processing.
Figure 24:
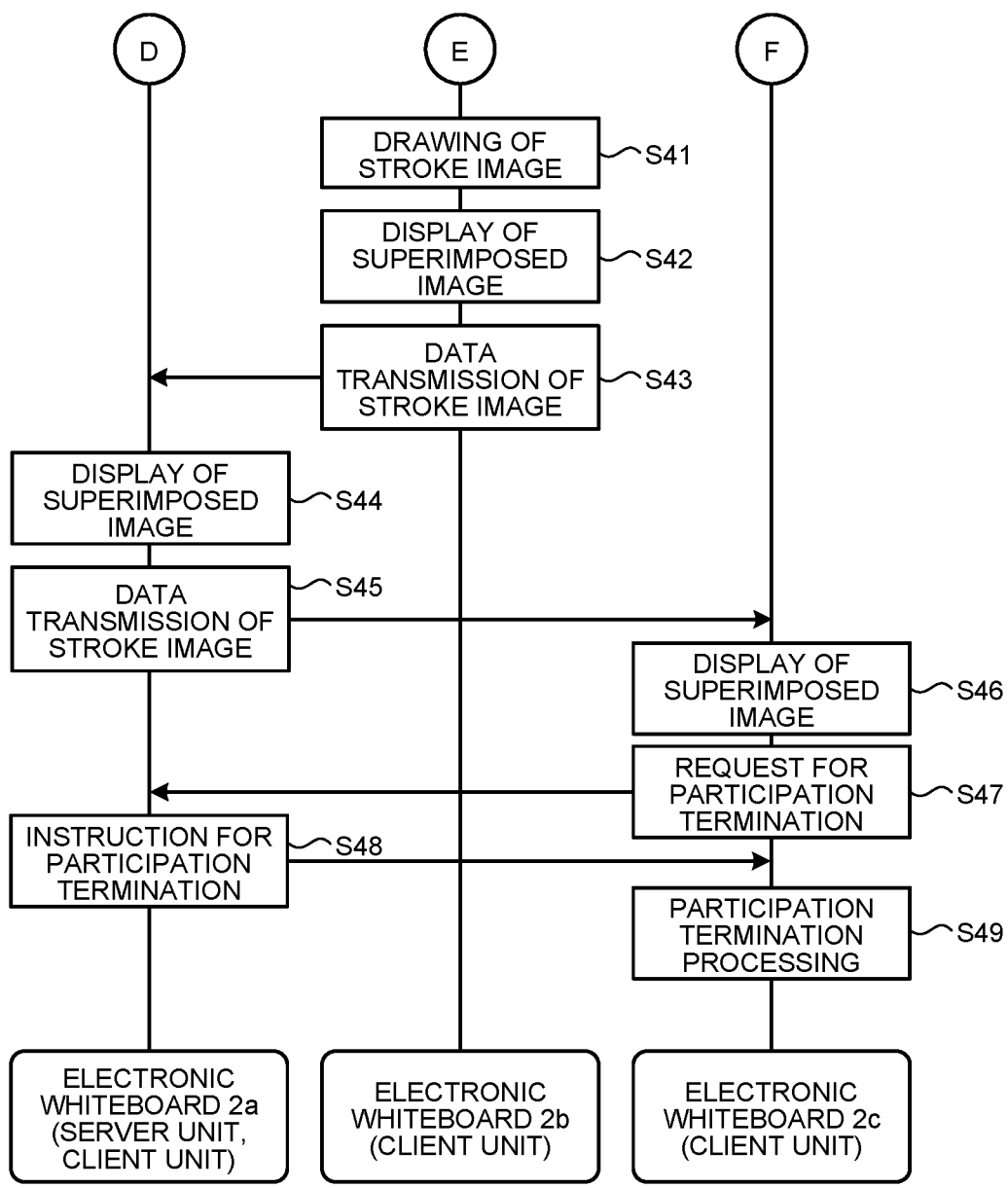
FIG. 24 is a (second) sequence diagram for describing the remote share processing.
Figure 26:
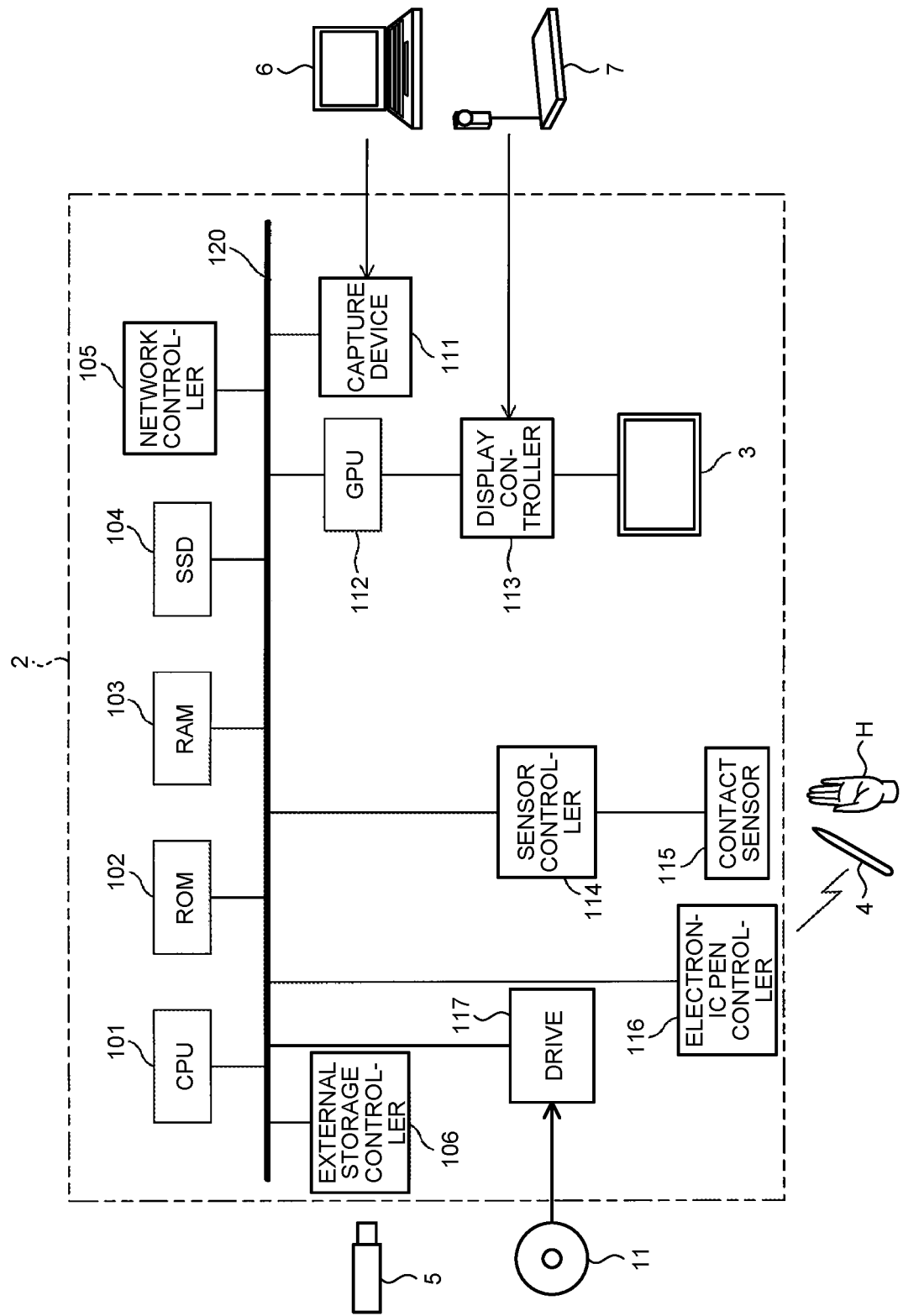
FIG. 26 is a hardware configuration diagram of an electronic whiteboard capable of reading an information recording medium.

Next, the operations of a plurality of electronic whiteboards constituting an image processing system 1 of the present embodiment in remote sharing processing therebetween are described using FIG. 23 and FIG. 24.

Here is an example in which the image processing system 1 includes three electronic whiteboards (2a, 2b, 2c), the electronic whiteboard 2a being a host device that hosts remote sharing processing, the electronic whiteboard 2b and the electronic whiteboard 2c being participating devices that participate in the remote sharing processing started by the electronic whiteboard 2a.

The electronic whiteboard 2a includes the display 3a, the electronic whiteboard 2b includes the display 3b, and the electronic whiteboard 2c includes a display 3c. Furthermore, the electronic whiteboard 2a is connected to the notebook PC 6a, the electronic whiteboard 2b is connected to the notebook PC 6b, and the electronic whiteboard 2c is connected to a notebook PC 6c. Furthermore, the electronic pen 4a is used in the electronic whiteboard 2a, the electronic pen 4b is used in the electronic whiteboard 2b, and an electronic pen 4c is used in the electronic whiteboard 2c.

1. Processing for Participation

First, processing for participation by the electronic whiteboards 2b and 2c in remote sharing processing is described.

Here, it is assumed that each of the electronic whiteboard 2a, the electronic whiteboard 2b, and the electronic whiteboard 2c is powered on by a user, whereby the client unit 20 is started up.

When the user of the electronic whiteboard 2a starts up the server unit 90 with an input device such as a touch panel, the remote start processing unit 61 of the client unit 20 outputs a command to start processing in the server unit 90 to the remote connection request receiving unit 71 in the server unit 90 of the same electronic whiteboard 2a. With this, the electronic whiteboard 2a can start various kinds of processing in the server unit 90 (Step S21).

Subsequently, the UI image generating unit 33 in the client unit 20 of the electronic whiteboard 2a generates connection information for establishing connection with the electronic whiteboard 2a, and the video superimposing unit 28 displays the connection information acquired from the UI image generating unit 33 via the display superimposing unit 36 on the display 3a (Step S22).

The above-mentioned connection information includes the IP address of a host device and a passcode generated for the present remote sharing processing.

In this case, the passcode stored in the passcode management unit 810 is read by the remote connection processing unit 81, and transmitted to the remote connection result transmitting unit 72 and the remote start processing unit 61 in this order. Furthermore, the passcode is transmitted from the communication control unit 60 including the remote start processing unit 61 to the image processing unit 30, and finally input to the UI image generating unit 33. Thus, the connection information includes the passcode.

Then, the connection information is provided to the users of the electronic whiteboard 2b and the electronic whiteboard 2c by telephone or electronic mail from the user of the electronic whiteboard 2a. Note that, with the presence of the connection destination management table 440, a participating device can make a participation request, even if the connection information does not include the IP address of a host device.

Subsequently, when the electronic whiteboard 2b receives the input of the connection information by the user's operation of an input device such as a touch panel, based on the IP address included in the connection information, the remote participation processing unit 62 in the client unit 20 of the electronic whiteboard 2b transmits a passcode to the communication control unit 70 in the server unit 90 of the electronic whiteboard 2a via the communication network 9 to make a participation request (Step S23).

Likewise, when the electronic whiteboard 2c receives the input of the connection information by the user's operation of an input device such as a touch panel, based on the IP address included in the connection information, the remote participation processing unit 62 in the client unit 20 of the electronic whiteboard 2c transmits a passcode to the communication control unit 70 in the server unit 90 of the electronic whiteboard 2a via the communication network 9 to make a participation request (Step S24).

In the electronic whiteboard 2a, when receiving the participation request (including the passcode) from each of the electronic whiteboard 2b and the electronic whiteboard 2c, the remote connection request receiving unit 71 of the communication control unit 70 outputs the passcode to the remote connection processing unit 81.

Subsequently, in the electronic whiteboard 2a, the remote connection processing unit 81 authenticates the passcode received from each of the electronic whiteboard 2b and the electronic whiteboard 2c by using the passcode managed in the passcode management unit 810 (Step S25).

Then, in the electronic whiteboard 2a, the remote connection result transmitting unit 72 informs the client unit 20 of each of the electronic whiteboard 2b and the electronic whiteboard 2c about an authentication result (Steps S26 and S27).

If it is determined in the authentication at the above-described Step S25 that the electronic whiteboard 2b and the electronic whiteboard 2c are valid electronic whiteboards, then communication for remote sharing processing between the electronic whiteboard 2a serving as a host device and the electronic whiteboards 2b and 2c each serving as a participating device is established, and the remote participation processing unit 62 in the client unit 20 of each of the electronic whiteboards 2b and 2c allows the start of remote sharing processing with other electronic whiteboards (Steps S28 and S29).

2. Display of PC Output Image

Next, processing for displaying a PC output image in remote sharing processing is described. Here, an example is described in which a PC output image in the electronic whiteboard 2b is displayed on the display 3a of the electronic whiteboard 2a and the display 3c of the electronic whiteboard 2c.

First, the electronic whiteboard 2b displays a PC output image on the display 3b (Step S30).

Specifically, the image acquisition unit 31 of the electronic whiteboard 2b acquires the PC output image from an output video (a PC output video) of the notebook PC 6b, and transmits to the display 3b via the display superimposing unit 36 and the video superimposing unit 28, whereby the display 3b displays the PC output image.

Subsequently, the image processing unit 30 including the image acquisition unit 31 of the electronic whiteboard 2b transmits data on the PC output image to the remote image transmitting unit 63, whereby the communication control unit 60 including the remote image transmitting unit 63 transmits the data on the PC output image to the communication control unit 70 of the electronic whiteboard 2a serving as a host device via the communication network 9 (Step S31).

The remote image receiving unit 73 of the electronic whiteboard 2a receives the data on the PC output image in the electronic whiteboard 2b and outputs the data to the remote image processing unit 82, whereby the remote image processing unit 82 stores the data on the PC output image in the image data management unit 830.

Subsequently, the electronic whiteboard 2a serving as a host device displays the PC output image in the electronic whiteboard 2b on the display 3a (Step S32).

Specifically, the remote image processing unit 82 of the electronic whiteboard 2a outputs the data on the PC output image received from the remote image receiving unit 73 to the remote image transmitting unit 74. The remote image transmitting unit 74 outputs the data on the PC output image to the remote image receiving unit 64 in the client unit 20 of the electronic whiteboard 2a as the same host device.

The remote image receiving unit 64 outputs the data on the PC output image to the display superimposing unit 36. The display superimposing unit 36 outputs the data on the PC output image to the video superimposing unit 28. The video superimposing unit 28 outputs the data on the PC output image to the display 3a. Thus, the display 3a displays the PC output image in the electronic whiteboard 2b.

Subsequently, the communication control unit 70 including the remote image transmitting unit 74 in the server unit 90 of the electronic whiteboard 2a serving as a host device transmits the data on the PC output image in the electronic whiteboard 2b to the communication control unit 60 of the electronic whiteboard 2c other than the electronic whiteboard 2b serving as a transmission source of the data on the PC output image via the communication network 9 (Step S33).

Thus, the remote image receiving unit 64 of the electronic whiteboard 2c serving as a participating device receives the data on the PC output image in the electronic whiteboard 2b.

Subsequently, the electronic whiteboard 2c displays the PC output image in the electronic whiteboard 2b on the display 3c (Step S34).

Specifically, the remote image receiving unit 64 of the electronic whiteboard 2c outputs the data on the PC output image received at the above-described Step S33 to the display superimposing unit 36 of the electronic whiteboard 2c. The display superimposing unit 36 outputs the data on the PC output image to the video superimposing unit 28.

The video superimposing unit 28 outputs the data on the PC output image to the display 3c. Thus, the display 3c displays the PC output image in the electronic whiteboard 2b.

Note that, in the case where not only data on a PC output image but also data on a UI image and data on a stroke image are input to the display superimposing unit 36, the display superimposing unit 36 generates a superimposed image of the UI image, the stroke image, and the PC output image, and the video superimposing unit 28 outputs data on the superimposed image to the display 3c.

Furthermore, in the case where data on a video for a videoconference (hereinafter, also referred to as a "conference video") is transmitted from the videoconference terminal 7 to the video superimposing unit 28, the video superimposing unit 28 superimposes the data on the conference video upon the above-described superimposed image in a picture-in-picture fashion, and outputs the resultant data to the display 3c.

3. Display of Superimposed Image

Next, processing for displaying a superimposed image in remote sharing processing is described. Here, an example is described in which a superimposed image in the electronic whiteboard 2b is displayed on the display 3a of the electronic whiteboard 2a and the display 3c of the electronic whiteboard 2c.

First, in the electronic whiteboard 2b, a user draws a stroke image in the electronic whiteboard 2b by using the electronic pen 4b (Step S41).

Subsequently, the display superimposing unit 36 of the electronic whiteboard 2b superimposes the stroke image upon a UI image and a PC output image. Then, the video superimposing unit 28 displays the superimposed image in which the UI image, the stroke image, and the PC output image are superimposed, on the display 3b of the electronic whiteboard 2b (Step S42).

Specifically, the stroke processing unit 32 of the electronic whiteboard 2b receives data on the stroke image from the event classifying unit 25, and transmits the data to the display superimposing unit 36. With this, the display superimposing unit 36 can superimpose the stroke image upon a UI image and a PC output image, whereby the video superimposing unit 28 can display a superimposed image on the display 3b of the electronic whiteboard 2b.

Subsequently, the image processing unit 30 including the stroke processing unit 32 of the electronic whiteboard 2b transmits the data on the stroke image to the remote operation transmitting unit 65, whereby the remote operation transmitting unit 65 of the electronic whiteboard 2b transmits the data on the stroke image to the communication control unit 70 of the electronic whiteboard 2a serving as a host device via the communication network 9 (Step S43).

Thus, the remote operation receiving unit 75 of the electronic whiteboard 2a receives the data on the stroke image in the electronic whiteboard 2b, and outputs the data to the remote operation processing unit 83, whereby the remote operation processing unit 83 outputs the data on the stroke image to the operation synthesis processing unit 84.

In this way, whenever a stroke image is drawn in the electronic whiteboard 2b, data on the stroke image is sequentially transmitted to the remote operation processing unit 83 of the electronic whiteboard 2a serving as a host device. The data on the stroke image is data represented by each stroke data ID. Hence, for example, in the case where a user draws "T" in the alphabet with the electronic pen 4, the drawing is a two-stroke drawing, and accordingly, two pieces of stroke image data represented by two respective stroke data IDs are sequentially transmitted.

Subsequently, the electronic whiteboard 2a serving as a host device displays a superimposed image including the data on the stroke image transmitted from the electronic whiteboard 2b on the display 3a (Step S44).

Specifically, the operation synthesis processing unit 84 of the electronic whiteboard 2a synthesizes a plurality of pieces of the data on the stroke images sequentially transmitted via the remote operation processing unit 83, and stores the synthesized data in the operation data storage unit 840 and also returns the data to the remote operation processing unit 83.

Thus, the remote operation processing unit 83 outputs the synthesized stroke image data received from the operation synthesis processing unit 84 to the remote operation transmitting unit 76. The remote operation transmitting unit 76 outputs the synthesized stroke image data to the remote operation receiving unit 66 in the client unit 20 of the electronic whiteboard 2a serving as the same host device.

The remote operation receiving unit 66 outputs the synthesized stroke image data to the display superimposing unit 36 in the image processing unit 30. Thus, the display superimposing unit 36 superimposes the synthesized stroke image data upon an UI image and a PC output image. Finally, the video superimposing unit 28 displays, on the display 3a, a superimposed image obtained by the superimposing operation by the display superimposing unit 36.

Subsequently, the communication control unit 70 including the remote operation transmitting unit 76 in the server unit 90 of the electronic whiteboard 2a serving as a host device transmits the synthesized stroke image data to the communication control unit 60 of the electronic whiteboard 2c via the communication network 9 (Step S45).

Thus, the remote operation receiving unit 66 of the electronic whiteboard 2c serving as a participating device receives the synthesized stroke image data.

Subsequently, the electronic whiteboard 2c displays the superimposed image in the electronic whiteboard 2b on the display 3c (Step S46).

Specifically, the remote operation receiving unit 66 of the electronic whiteboard 2c outputs the synthesized stroke image data received at the above-described Step S45 to the image processing unit 30 of the electronic whiteboard 2c. The display superimposing unit 36 of the image processing unit 30 superimposes data on an UI image and data on a PC output image upon the synthesized stroke image data, and outputs the resultant data on a superimposed image to the video superimposing unit 28.

The video superimposing unit 28 outputs the data on the superimposed image to the display 3c. Thus, the display 3c displays the superimposed image in the electronic whiteboard 2b.

Note that, in the above-described processing, a PC output image is displayed on the display 3, but, instead of the PC output image, a background image may be displayed. Alternatively, instead of employing the exclusive relationship between a PC output image and a background image, both a PC output image and a background image may be displayed on the display 3 at the same time.

4. Termination of Participation

Next, processing in which a participating device terminates participation in remote sharing processing is described. Here, an example is described in which the electronic whiteboard 2c terminates the participation.

First, when the electronic whiteboard 2c receives a request for the termination of the participation through the user's operation of an input device such as a touch panel, the remote participation processing unit 62 makes a request for the termination of the participation to the communication control unit 70 in the server unit 90 of the electronic whiteboard 2a serving as a host device (Step S47).

Thus, the remote connection request receiving unit 71 of the communication control unit 70 receives the participation termination request from the electronic whiteboard 2c, and outputs the participation termination request to the remote connection processing unit 81 together with the IP address of the electronic whiteboard 2c.

Then, based on the IP address transmitted from the remote connection request receiving unit 71, the remote connection processing unit 81 of the electronic whiteboard 2a deletes, from the participating site management table 820, the IP address of the electronic whiteboard 2c that has made the participation termination request and the name of a site in which the electronic whiteboard 2c is installed, and outputs the IP address of the electronic whiteboard 2c and a notice of the deletion thereof to the remote connection result transmitting unit 72.

Subsequently, the communication control unit 70 including the remote connection result transmitting unit 72 instructs the communication control unit 60 in the client unit 20 of the electronic whiteboard 2c to terminate the participation, via the communication network 9 (Step S48).

In response to this instruction, the remote participation processing unit 62 of the communication control unit 60 in the electronic whiteboard 2c cuts off communication for remote sharing processing, and performs participation termination processing to terminate the participation (Step S49).

As is clear from the description above, in the present embodiment, the coordinate detecting unit 22 and the contact detecting unit 24 perform the step of acquiring an event in a method for image processing in the electronic whiteboard according to the present invention, the event classifying unit 25 performs the step of identifying the type of the event in the method for image processing in the electronic whiteboard according to the present invention, and the operation processing unit 26, the gesture processing unit 27, and the image processing unit 30 perform the step of controlling a display unit in the method for image processing in the electronic whiteboard according to the present invention.

As described above, the image processing system 1 according to the present embodiment includes a plurality of electronic whiteboards connected to each other via the communication network 9 so as to enable mutual communication therebetween. Furthermore, each of the electronic whiteboards is connected to the notebook PC 6 and the videoconference terminal 7.

The electronic whiteboard 2 includes the display 3, the CPU 101, the ROM 102, the RAM 103, the SSD 104, the network controller 105, the external storage controller 106, the capture device 111, the GPU 112, the display controller 113, the sensor controller 114, the contact sensor 115, the electronic pen controller 116, and the like.

The electronic whiteboard 2 has a function as the client unit 20 and a function as the server unit 90. When the electronic whiteboard 2 serves as a "host device", both the functions are implemented. When the electronic whiteboard 2 serves as a "participating device", only the function as the client unit 20 is implemented.

The function as the client unit 20 can be divided into the video acquisition unit 21, the coordinate detecting unit 22, the automatic adjustment unit 23, the contact detecting unit 24, the event classifying unit 25, the operation processing unit 26, the gesture processing unit 27, the video superimposing unit 28, the image processing unit 30, the device information determining unit 38, and the communication control unit 60.

The coordinate detecting unit 22 detects the location coordinates of the contact of the electronic pen 4 or the user's hand H with the display 3. The contact detecting unit 24 detects whether it is the electronic pen 4 that has come into contact with the display 3. The device information determining unit 38 acquires the model number of the display 3 from the display 3, and determines the model name of the electronic whiteboard 2 from the model number.

Based on location coordinates detected by the coordinate detecting unit 22, a detection result in the contact detecting unit 24, and a determination result in the device information determining unit 38, the event classifying unit 25 determines which of "stroke drawing", "UI operation", or "gesture operation" an event corresponds to, and outputs event information to the image processing unit 30 if the event is "stroke drawing", to the operation processing unit 26 if the event is "UI operation", and to the gesture processing unit 27 if the event is "gesture operation".

In conventional electronic whiteboards, a user needs to set whether "stroke drawing" by a user's hand H is available or not. In this case, the user is forced to do complicated work, which impaired usability. Furthermore, there is a possibility that a setting omission or a setting error, if any, hinders the electronic whiteboard from displaying its performance to the fullest.

In contrast, in the electronic whiteboard 2 according to the present embodiment, the electronic whiteboard 2 determines whether "stroke drawing" by a user's hand H is available, and therefore, the user does not need to make the setting, and usability can be improved. Furthermore, different models can share the event classifying unit 25, whereby a reduction in cost and a shortened development cycle can be achieved.

Note that, in the above-described embodiment, a case has been described in which device information is a model name, but the device information is not limited thereto. For example, the device information may be device configuration information illustrated as an example in FIG. 25. In such case, in the event classifying unit 25, as one condition for determining the type of an event, for example, the presence or absence of the electronic pen controller 116 may be employed.

In the above-described embodiment, the use of the electronic pen 4a may not be allowed in the electronic whiteboard 2a. In this case, the electronic whiteboard 2a may not include the electronic pen controller 116.

In the above-described embodiment, the communication network 9 may be a local area network (LAN), the Internet, or a network that partially includes, for example, a cellular phone communication network.

In the above-described embodiment, a case has been described in which an electronic whiteboard is used as an example of an image processing apparatus, but the image processing apparatus is not limited thereto, and use may be made of an electronic signboard (digital signage), a telestrator used for, for example, sports and weather forecasting, or a remote image (video) diagnostic apparatus may be used.

In the above-described embodiment, a case has been described in which, for example, a setting file, a backup file, and an address book are stored in a USB memory, but, the present invention is not limited to this. Instead of a USB memory or in addition to a USB memory, other memory media, such as an SD card, may be used.

In the above-described embodiment, a case has been described in which a notebook PC is used as an example of a video output apparatus, but, the video output apparatus is not limited to this, and use may be made of, for example, a desktop PC, a tablet PC, a PDA, a digital video camera, a digital camera, or a game machine. In other words, any terminal capable of supplying an image frame can be used.

In the above-described embodiment, a case has been described in which various computer programs are stored in the ROM 102, but, the present invention is not limited to this. For example, various computer programs may be stored in information recording media 11, such as CD and DVD (refer to FIG. 26). In this case, the electronic whiteboard includes a drive 117 (refer to FIG. 26) for reading the various computer programs from the information recording medium.

The coordinate detecting unit 22 and the contact detecting unit 24 perform the procedure of acquiring an event by a recording medium in which computer programs of the electronic whiteboard according to the present invention are recorded, the event being indicated in the computer program. The event classifying unit 25 performs the procedure of identifying the type of the event indicated in the program. The operation processing unit 26, the gesture processing unit 27, and the image processing unit 30 perform the procedure of controlling a display unit indicated in the program.

In the above-described embodiment, hardware may constitute a part of processing in accordance with a computer program by the CPU 101.

REFERENCE SIGNS LIST 1 image processing system
2a electronic whiteboard (image processing apparatus)
2b electronic whiteboard (image processing apparatus)
3a display (display unit)
3b display (display unit)
4a electronic pen
4b electronic pen
5a USB memory
5b USB memory
6a notebook PC
6b notebook PC
8 PC
9 communication network
10a1 cable
10a2 cable
10b1 cable
10b2 cable
20 client unit
21 video acquisition unit
22 coordinate detecting unit (part of event acquisition unit)
23 automatic adjustment unit
24 contact detecting unit (part of event acquisition unit)
25 event classifying unit (identifying unit)
26 operation processing unit (part of processing unit)
27 gesture processing unit (part of processing unit)
28 video superimposing unit
30 image processing unit
31 image acquisition unit
32 stroke processing unit (part of processing unit)

33 UI image generating unit
34 background generating unit
35 layout management unit
36 display superimposing unit
37 page processing unit
38 device information determining unit
40 file processing unit
60 communication control unit
70 communication control unit
80 data management unit
90 server unit
101 CPU
102 ROM (recording medium)
103 RAM
104 SSD
105 network controller (communication control unit)
106 external storage controller
111 capture device
112 GPU
113 display controller
114 sensor controller
115 contact sensor
116 electronic pen controller
300 page data storage unit
310 remote license management table

CITATION LIST

Patent Literature

Patent Literature 1: Japanese Patent Application Laid-open No. 2015-084211

The invention claimed is:

1. An electronic whiteboard, comprising:
a display to display an image, the display including a touch panel;
event acquisition circuitry configured to acquire an event which has occurred on the display, the event including a "stroke drawing" or a "gesture operation";
identifying circuitry configured to identify a type of the event with reference to device information; and
processing circuitry configured to perform processing on the event according to a result of identification by the identifying circuitry,
wherein:
the identifying circuitry automatically determines, based on the device information, whether "stroke drawing" by a user's hand is available,
the identifying circuitry identifies the event as "gesture operation", when contact with the display is made at two or more points and the identifying circuitry automatically determines that "stroke drawing" by the user's hand is available,
the identifying circuitry identifies the event as "stroke drawing", when the identifying circuitry determines that contact with the display is made at one point, and
wherein, when the identifying circuitry automatically determines that "stroke drawing" by the user's hand is not available when the event is an event by the user's hand, the identifying circuitry identifies the event as "gesture operation", and when the event is an event with an electronic pen, the identifying circuitry identifies the event as "stroke drawing".

2. The electronic whiteboard according to claim 1, wherein
the event includes one of "stroke drawing", "gesture operation", and "user interface operation", and
the identifying circuitry identifies the event as "user interface operation" when a location of the event which has occurred on the display overlaps a display area for a user interface image.

3. The electronic whiteboard according to claim 1, wherein the device information is model name information.

4. The electronic whiteboard according to claim 1, wherein the device information is device configuration information.

5. The electronic whiteboard according to claim 4, further comprising:
interface circuitry for connection to a network line; and
communication control circuitry configured to control communication via the network line.

6. A method, comprising:
automatically determining, based on device information, whether "stroke drawing" by a user's hand is available;
acquiring an event which has occurred on a display, the event including a "stroke drawing" or a "gesture operation";
identifying a type of the event with reference to the device information, the event being identified as a "gesture operation" when contact with the display is made at two or more points, and the event being identified as "stroke drawing" when "stroke drawing" by the user's hand is determined to be available and contact with the display is made at one point; and
performing processing on the event according to a result of the identifying,
wherein:
when the identifying the type of the event determines that "stroke drawing" by the user's hand is not available, when the event is an event by the user's hand, the identifying identifies the event as "gesture operation", and
when the event is an event with an electronic pen, the identifying identifies the event as "stroke drawing".

7. The method according to claim 6, wherein:
the event includes one of "stroke drawing", "gesture operation", and "user interface operation", and
the identifying identifies the event as "user interface operation" when a location of the event which has occurred on the display overlaps a display area for a user interface image.

8. The method according to claim 6, wherein:
the device information is model name information.

9. The method according to claim 6, wherein:
the device information is device configuration information.

* * * * *